(12) United States Patent
Giannakis et al.

(10) Patent No.: US 7,496,128 B2
(45) Date of Patent: Feb. 24, 2009

(54) MULTI-USER INTERFERENCE RESILIENT ULTRA WIDEBAND (UWB) COMMUNICATION

(75) Inventors: Georgios B. Giannakis, Minnetonka, MN (US); Liuqing Yang, Falcon Heights, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 974 days.

(21) Appl. No.: 10/796,895

(22) Filed: Mar. 8, 2004

(65) Prior Publication Data

US 2004/0240527 A1    Dec. 2, 2004

Related U.S. Application Data

(60) Provisional application No. 60/453,809, filed on Mar. 8, 2003.

(51) Int. Cl.
*H04B 1/00* (2006.01)
(52) U.S. Cl. .................................... 375/138; 375/140
(58) Field of Classification Search ................ 375/138, 375/140
See application file for complete search history.

(56) References Cited

U.S. PATENT DOCUMENTS

| | | | |
|---|---|---|---|
| 5,375,146 A | 12/1994 | Chalmers | |
| 6,301,288 B1 * | 10/2001 | Molev-Shteiman | ......... 375/140 |
| 6,556,621 B1 | 4/2003 | Richards et al. | |
| 6,636,723 B1 * | 10/2003 | Kitagawa et al. | ............. 455/69 |
| 6,678,314 B2 * | 1/2004 | Juntti et al. | ................. 375/150 |
| 6,744,832 B2 | 6/2004 | Miao | |
| 6,834,073 B1 | 12/2004 | Miller et al. | |
| 6,925,109 B2 | 8/2005 | Richards et al. | |
| 6,959,032 B1 | 10/2005 | Richards et al. | |
| 7,031,371 B1 | 4/2006 | Lakkis | |
| 7,068,715 B2 | 6/2006 | Hoctor et al. | |
| 7,187,699 B1 * | 3/2007 | Raaf et al. | .................. 370/545 |
| 7,605,057 | 12/2007 | Miao | |
| 2001/0053175 A1 | 12/2001 | Hoctor et al. | |
| 2003/0069025 A1 | 4/2003 | Hoctor et al. | |
| 2003/0108133 A1 | 6/2003 | Richards | |

(Continued)

OTHER PUBLICATIONS

Le Martret, "All-Digital Impulse Radio for MUI/ISI-Resilient Transmissions through Frequency-Selective Multipath Channels," Proc. of MILCOM Conf., Los Angeles, CA, Oct. 22-25, 2000.*
Z. Wang et al., "Block Precoding for MUI/ISI-Resilient Generalized Multicarrier CDMA with Multirate Capabilities," IEEE Transactions on Communications, vol. 49, No. 11, pp. 2016-2027, Nov. 2001.
F. Ramirez-Mireles et al., "System Performance Analysis of Impulse Radio Modulation,"Procedings Radio Wireless Conference, Colorado Springs, CO, pp. 67-70, Aug. 1998.

(Continued)

*Primary Examiner*—Juan A. Torres
(74) *Attorney, Agent, or Firm*—Shumaker & Sieffert, P.A.

(57) ABSTRACT

Techniques are described for maintaining the orthogonality of waveforms transmitted in ultra wideband (UWB) multi-user wireless communication systems. The multi-stage block-spreading (MS-BS) techniques described herein deterministically eliminate multiple user interference (MUI) in the presence of frequency-selective fading channels. A transmitter includes a block-spreading unit to generate a stream of frames from a block of information bearing symbols by applying an orthogonal set of spreading codes, such as direct sequence cod& division multiple access (CDMA) codes or digital carrier frequency multiple access codes, such that the frames corresponding to different blocks of the symbols are interleaved. The transmitter further includes a time-hopping spreading unit to generate a stream of chips from the stream of frames by applying an orthogonal set of time-hopping (TH) spreading codes such that chips corresponding to different frames are interleaved.

27 Claims, 13 Drawing Sheets

U.S. PATENT DOCUMENTS

| | | | |
|---|---|---|---|
| 2003/0147655 | A1 | 8/2003 | Shattil |
| 2003/0198212 | A1 | 10/2003 | Hoctor et al. |
| 2003/0198308 | A1 | 10/2003 | Hoctor et al. |
| 2004/0028004 | A1* | 2/2004 | Hayashi et al. ............. 370/320 |
| 2004/0156421 | A1 | 8/2004 | Yamaguchi |
| 2004/0174770 | A1 | 9/2004 | Rees |
| 2004/0233972 | A1 | 11/2004 | Karaoguz |
| 2005/0001684 | A1 | 1/2005 | Braithwaite |
| 2005/0141460 | A9 | 6/2005 | Currivan et al. |
| 2006/0285607 | A1 | 12/2006 | Strodtbeck et al. |

OTHER PUBLICATIONS

M. Win et al., "Ultra-Wide Bandwidth Time-Hopping Spread-Spectrum Impulse Radio for Wireless Multiple-Access Communications," IEEE Transactions on Communications, vol. 48, No. 4, pp. 679-691, Apr. 2000.

A. Saleh et al., "A Statistical Model for Indoor Multipath Propagation," IEEE Journal on Selected Areas in Communications, vol. SAC-5, No. 2, pp. 128-137, Feb. 1987.

B. Hassibi et al., "On the Expected Complexity of Sphere Decoding," Proceedings of the Asilomar Conference on Signals, Systems and Computers, vol. 2, pp. 1051-1055, 2001.

B. Hochwald et al., "Unitary Space-Time Modulation for Multiple-Antenna Communications in Rayleigh Flat Fading," IEEE Transactions on Information Theory, vol. 46, No. 2, pp. 543-564, Mar. 2000.

C. Le Martret et al., "All-Digital PPM Impulse Radio for Multiple-Access Through Frequency-Selective Multipath," Procedures of GLOBECOM, vol. 1, pp. 22-26, San Francisco, CA, Nov. 17-Dec. 1, 2000.

C.J. Le Martret et al., "All-Digital Impulse Radio with Multiuser Detection for Wireless Cellular Systems," IEEE Transactions on Communications, vol. 50, No. 9, pp. 1440-1450, Sep. 2002.

C.J. Le Martret et al., "All-Digital PAM Impulse Radio for Multiple-Access Through Frequency-Selective Multipath," Procedure of Sensor Array and Multichannel Signal Processing Workshop, Boston, pp. 77-81, Mar. 2000.

D. Cassioli et al., "Performance of Low-Complexity Rake Reception in a Realistic UWB Channel," 2002 IEEE International Conference on Communications, pp. 763-767, New York City, N.Y., Apr. 28-May 2, 2002.

E. Homier et al., "Rapid Acquisition of Ultra-Wideband Signals in the Dense Multipath Channel," G.E. Research Development Center, Technical Information Series, pp. 105-109, Jan. 2002.

F. Gini et al., "Frequency Offset and Symbol Timing Recovery in Flat-Fading Channels: A Cyclostationary Approach," IEEE Transactions On Communications, vol. 46, No. 3, pp. 400-411, Mar. 1998.

F. Ramirez-Mireles et al., "Multiple Access With Time-Hopping and Block Waveform PPM Modulation," 1998 IEEE International Conference on Communciations, vol. 2 of 3, pp. 775-779, Atlanta, Georgia, Jun. 1998.

G. Leus et al., "MUI-Free Receiver for a Synchronous DS-CDMA System Based on Block Spreading in the Presence of Frequency-Selective Fading," IEEE Transactions on Signal Processing, vol. 48, No. 11, pp. 3175-3188, Nov. 2000.

G.B. Giannakis et al., "AMOUR-Generalized Multicarrier Transceivers for Blind CDMA Regardless of Multipath," IEEE Transactions on Communciations, vol. 48, No. 12, pp. 2064-2076, Dec. 2000.

H. Lee et al., "Multipath Characteristics of Impulse Radio Channels," 2000 IEEE 51st Vehicular Technology Conference Proceedings, Tokyo, Japan, pp. 2487-2491, May 15-18, 2000.

J.D. Choi et al., "Performance of Autocorrelation Receivers for Ultra-Wideband Communications with PPM in Multipath Channels," 2002 IEEE Conference on Ultra Wideband Systems and Technologies, pp. 213-217, Baltimore, MD, USA, May 2002.

J.D. Choi et al., "Performance of Ultra-Wideband Communications With Suboptimal Receivers in Mulipath Channels," IEEE Journal on Selected Areas in Communications, vol. 20, No. 9, pp. 1754-1766, Dec. 2002.

J.K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

J.R. Foerster, "The Effects of Multipath Interference on the Performance of UWB Systems in and Indoor Wireless Channel," IEEE VTS 53rd Vehicular Technology Conference, vol. 2, pp. 1176-1180, Rhodes, Greece, May 6-9, 2001.

J.R. Foerster et al., "Ultra-Wideband Technology for Short- or Medium-Range Wireless Communications," Ultra-Wideband Technology for Short- or Medium-Range Wireless Communications, pp. 1-11, Apr. 2001.

K.Siwiak et al., "Ultra-Wide Band Radio: The Emergence of An Important New Technology," IEEE VTS 53rd Vehicular Technology Conference, vol. 2, pp. 1169-1172, Rhodes, Greece, May 6-9, 2001.

L. Yang et al., "Multistage Block-Spreading for Impulse Radio Multiple Access Through ISI Channels," IEEE Journal on Selected Areas in Communications, vol. 20, No. 9, pp. 1767-1777, Dec. 2002.

L. Yang et al., "Space-Time Coding for Impulse Radio," 2002 IEEE Conference on Ultra Wideband Systems and Technologies, pp. 235-239, Baltimore, MN, May 20-23, 2002.

L. Yang et al., "Impulse Radio Muliple Access Through ISI Channels With Multi-Stage Block-Spreading" 2002 IEEE Conference on Ultra Wideband Systems and Technologies, pp. 277-281, Baltimore, MD, May 21-23, 2002.

L. Yang et al., "Optimal Pilot Waveform Assisted Modulation for Ultrawideband Communications," IEEE Transactions on Wireless Communications, vol. 3, No. 4, pp. 1236-1349, Jul. 2004.

L. Yang et al., "Non-Data Aided Timing Acquisition of Ultra-Wideband Transmissions Using Cyclostationarity," 2003 IEEE International Conference on Acoustics, Speech and Signal Processing, Hong Kong, vol. IV of VI, Apr. 6-10, 2003.

M.Z. Win et al., "Impulse Radio: How it Works," IEEE Communications Letters, vol. 2, No. 2, pp. 36-38, Feb. 1998.

M.L. Welborn, "System Considerations for Ultra-Wideband Wireless Networks," 2001 IEEE Radio and Wireless Conference, pp. 5-8, Boston, MA, Aug. 19-22, 2001.

M.Z. Win et al., "On the Energy Capture of Ultrawide Bandwidth Signals in Dense Multipath Environments," IEEE Communications Letters, vol. 2, No. 9, pp. 245-247, Sep. 1998.

M.Z. Win et al., "Virtual Path Analysis of Selective Rake Receiver in Dense Multipath Channels," IEEE Communications Letters, vol. 3, No. 11, pp. 308-310, Nov. 1999.

M.Z. Win et al., "ATM-Based TH-SSMA Network for Multimedia PCS," IEEE Journal on Selected Areas in Communications, vol. 17, No. 5, pp. 824-836, May 1999.

O. Wintzell et al., "On the Capacity of a Pulse-Position-Hopped CDMA System." IEEE Transactions On Information Theory, vol. 47, No. 6, pp. 2639-2644, Sep. 2001.

P. Withington, II et al., "An Impulse Radio Communciations System," Ultra-Wideband, Short-Pulse Electromagnetics, Brooklyn, NY, pp. 113-112, Oct. 1992.

R. Fleming et al., "Rapid Acquisition for Ultra-Wideband Localizers," 2002 IEEE Conference on Ultra Wideband Systems and Technologies, Balimore, MD, pp. 245-249, May 21-21, 2002.

R.A. Scholtz, "Mulitple Access with Time-Hopping Impulse Modulation," Communications On The Move, Boston, MA, USA, pp. 447-450, Oct. 1993.

R.T. Hoctor et al., "An Overview of Delay-Hopped, Transmitted-Reference RF Communications," GE Research and Development Center, Technical Information Series, pp. 1-29, Jan. 2002.

S. Adireddy et al., "Optimal Placement of Training for Frequency-Selective Block-Fading Channels," IEEE Transactions On Information Theory, vol. 48, No. 8, pp. 2338-2353, Aug. 2002.

S. Ohno et al., "Optimal Training and Redundant Precoding for Block Transmissions with Application to Wireless OFDM," IEEE Transactions on Communications, vol. 50, No. 12, Dec. 2002.

S. Zhou et al., "Space-Time Coding with Maximum Diversity Gains Over Frequency-Selective Fading Channels," IEEE Signal Processing Letters, vol. 8, No. 10, pp, 269-272, Oct. 2001.

S. Zhou et al., "Chip-Interleaved Block-Spread Code Division Multiple Access," IEEE Transactions on Communications, vol. 50, No. 2, pp. 235-248, Feb. 2002.

S.M. Alamouti, "A Simple Transmit Diversity Technique for Wireless Communications," IEEE Journal On Selected Areas In Communications, vol. 16, No. 8, pp 1451-1458, Oct. 1998.

S.S Kolenchery et al., "Novel Impulse Radio Network for Tactical Wireless Communications," Procedures Milcom Conference, Bedford, MA, Oct. 1998.

S.S. Kolenchery et al., "Performance of Local Power Control in Peer-to-Peer Impulse Radio Networks With Bursty Traffic," IEEE Global Telecommunications Conference, vol. 2 of 3, Phoenix, AZ, USA, pp. 910-916, Nov. 3-8, 1997.

U. Fincke et al., "Improved Methods For Calculating Vectors of Short Length in a Lattice, Including a Complexity Analysis," Mathematics of Computation, vol. 44, No. 170, pp. 463-471, Apr. 1985.

V. Lottici et al., "Channel Estimation for Ultra-Wideband Communciations," IEEE Journal on Selected Areas in Communications, vol. 20, No. 9, pp. 1638-1645, Dec. 2002.

V. Tarokh et al., "Space-Time Block Codes From Orthogonal Designs," IEEE Transactions on Information Theory, vol. 45, No. 5, pp. 1456-1467, Jul. 1999.

V. Tarokh et al., "Space-Time Codes for High Data Rate Wireless Communication: Performance Criterion and Code Construction," IEEE Transactions on Information Theory, vol. 44, No. 2, pp. 744-765, Mar. 1998.

W.M. Lovelace et al., "The Effects of Timing Jitter on the Performance of Impulse Radio," 2002 IEEE Conference on Ultra Wideband Systems and Technologies, pp. 251-254, Baltimore, MD, May 21-23, 2002.

X. Chen et al., "Monocycle Shapes for Ultra Wideband System," 2002 IEEE International Symposium on Circuits and Systems, vol. I of V, pp. I-597-I-600, Scottsdale, AZ, May 25-29, 2002.

Z. Tian et al., "Symbol Timing Estimation in Ultra-Wideband Communications," Procecures of $36^{th}$ Asilomar Conference on Signals, Systems, and Computers, Pacific Grove, CA, Nov. 3-6, 2002.

Z. Wang et al., "Wireless Multicarrier Communications: Where Fourier Meets Shannon," IEEE Signal Processing Magazine, vol. 47, No. 3, pp. 1-21, May 2000.

Z. Wang et al., "Vandermonde-Lagrange Mutually Orthogonal Flexible Transceivers for Blind CDMA in Unknown Multipath," Procedures of Workshop on Signal Processing Advances in Wireless Communication, Annapolis, MD, pp. 42-45, May 9-12, 1999.

B. Parr et al., "A Novel Ultra-Wideband Pulse Design Algorithm," IEEE Communications Letter, vol. 7, No. 5, pp. 219-221, May 2003.

J. Romme et al., "On the Power Spectral Density of Time-Hopping Impulse Radio," 2002 IEEE Conference on Ultra-Wideband Systems and Technologies, Wyndham Baltimore Inner Harbor, pp. 241-244, May 2002.

M.Z. Win, "Spectral Density of Random UWB Signals," IEEE Communications Letters, vol. 6, No. 12, pp. 526-528, Dec. 2002.

J. Han et al., "A New Ultra-Wideband, Ultra-Short Monocycle Pulse Generator with Reduced Ringing," IEEE Microwave and Wireless Components Letters, vol. 12, No. 6, pp. 206-208, Jun. 2002.

J.S. Lee et al., "New Uniplanar Subnanosecond Monocycle Pulse Generator and Transformer for Time-Domain Microwave Applications," IEEE Transactions on Microwave Theory and Techniques, vol. 49, No. 6, pp. 1126-1129, Jun. 2001.

T.W. Parks et al., "Chebyshev Approximation for Nonrecursive Digital Filters with Linear Phase," IEEE Transactions on Circuit Theory, vol. CT-19, No. 2, pp. 189-194, Mar. 1972.

D. Kelly et al., "PulsON Second Generation Timing Chip: Enabling UWB Through Precise Timing," 2002 IEEE Conference on Ultra-Wideband Systems and Technologies, Wyndham Baltimore Inner Harbor, pp. 117-121, May 2002.

X. Luo et al., "Designing Optimal Pulse-Shapers for Ultra-Wideband Radios," Journal of Communications and Networks, vol. 5, No. 4, pp. 344-353, Dec. 2003.

J.R. Foerster, "The Performance of a Direct-Sequence Spread Ultra-Wideband System in the Presence of Multipath, Narrowband Interference, and Multiuser Interference," 2002 IEEE Conference on Ultra Wideband Systems and Technologies, Wyndham Baltimore Inner Harbor, pp. 87-92, May 2002.

B.M. Sadler et al., "On the Performance of UWB and DS-Spread Spectrum Communication Systems," 2002 IEEE Conference on Ultra Wideband Systems and Technologies, Wyndham Baltimore Inner Harbor, pp. 289-292, May 2002.

R.A. Scholtz, "Multiple Access with Time-Hopping Impulse Modulation," Communications on the Move, Conference Record vol. 2 of 3, MILCOM Conference, Boston, MA, pp. 447-450, 1993, Oct. 11-14, 1993.

Z. Wang, "Multi-Carrier Ultra-Wideband Multiple-Access with Good Resilience Against Multiuser Interference," 2003 Conference on Information Sciences & Systems, The John Hopkins University, Baltimore, MD, pp. 1-5, Mar. 2003.

D. Cassioli, et al., "Performance of Low-Complexity Rake Reception in a Realistic UWB Channel," 2002 IEEE International Conference on Communications, New York, NY, pp. 763-767, Apr. 28-May 2, 2002.

Z. Wang et al., "A Simple and General Parameterization Quantifying Performance in Fading Channels," IEEE Transactions on Communications, vol. 51, No. 8, pp. 1389-1398, Aug. 2003.

L. Yang et al., "Analog Space-Time Coding for Multiantenna Ultra-Wideband Transmissions," IEEE Transactions on Communications, vol. 52, No. 3, pp. 507-517, Mar. 2004.

I. Bergel et al., "Narrow-Band Interference Suppression in Time-Hopping Impulse-Radio Systems," 2002 IEEE Conference on Ultra Wideband Systems and Technologies, Wyndham Baltimore Inner Harbor, pp. 303-307, May 2002.

L. Yang et al., "Unification of Ultra-Wideband Multiple Access Schemes and Comparison in the Presence of Interference," The Thirty-Seventh Asilomar Conference on Signals, Systems & Computers, Pacific Grove, CA, pp. 1239-1243, Nov. 2003.

G. Durisi, et al., "Performance of TH and DS UWB Multiaccess Systems in Presence of Multipath Channel and Narrowband Interference," Procedure of International Workshop on Ultra Wideband Systems, Oulu, Finland, 5 pages, Jun. 2003.

Z. Wang et al., "Complex-Field Coding for OFDM Over Fading Wireless Channels," IEEE Transactions on Information Theory, vol. 49, No. 3, 707-720, Mar. 2003.

A. V. Oppenheim, et al., *Discrete-Time Signal Processing*, $2^{nd}$ Edition, Prentice Hall, Chapter 7, "Optimum Approximations of Fir Filters," pp. 486-511, 1999.

FCC Report and Order, *In the Matter of Revision of Part 15 of the Commission's Rules Regarding Ultra-Wideband Transmission Systems*, FCC 02-48, pp. 7434-7553, Apr. 2002.

IEEE P802.15 Working Group for WPAN, *Channel Modeling Sub-Committee Report Final*, IEEE 802.15-02/368r5-SG3a, pp. 1-40, Nov. 2002.

L. Yang et al., "Digital-Carrier Multi-Band User Codes for Baseband UWB Multiple Access," Journal of Communications and Networks, vol. 5, No. 4, pp. 374-385, Dec. 2003.

M. Hamalainen et al., "On the UWB System Coexistence With GSM900, UMTS/WCDMA, and GPS," IEEE Journal on Selected Areas in Communications, vol. 20, No. 9, pp. 1712-1721, Dec. 2002.

L. Zhao et al., "Performance of Ultra-Wideband Communications in the Presence of Interference," IEEE Journal on Selected Areas in Communications, vol. 20, No. 9, pp. 1684-1691, Dec. 2002.

S. Zhou et al., "Digital Multi-Carrier Spread Spectrum Versus Direct Sequence Spread Spectrum for Resistance to Jamming and Multipath," IEEE Transactions on Communications, vol. 50, No. 4, pp. 643-655, Apr. 2002.

LeMartret et al., "All-Digital Impulse Radio for MUI/ISI-Resilient Multi-User Communications Over Frequency-Selective Multipath Channels," Procedure of MILCOM Conference, Los Angeles, CA, pp. 655-659, Oct. 22-25, 2000.

P. Withington, "Impulse Radio Overview," Time Domain Copr., pp. 1-7, downloadable from http://user.it.uu.carle/Notes/UWB.pdf, Jan. 28, 1998.

Hovinen et al., "Ultra Wideband Radio Channel Modelling for Indoors," COST273 Workshop in Helsinki, 7 pages, May 29-30, 2002.

Kumar et al., "Application of Layered Space-Time Processing to Ultrawideband Communication," the 2002 $45^{th}$ Midwest Symposium on Circuits and Systems, 2002, MWSCAS-2002, vol. 3, Aug. 4-7, 2002, pp. III-597-600, vol. 3.

* cited by examiner

MULTI-USER INTERFERENCE RESILIENT ULTRA WIDEBAND (UWB) COMMUNICATION

This application claims priority from U.S. Provisional Application Ser. No. 60/453,809, filed Mar. 8, 2003, the entire content of which is incorporated herein by reference.

STATEMENT REGARDING FEDERALLY SPONSORED RESEARCH OR DEVELOPMENT

This invention was made with Government support under Subcontract #497420 awarded by the University of Delaware (Army Prime #DAAD19-01-2-011). The Government may have certain rights in the invention.

TECHNICAL FIELD

The invention relates to communication systems and, more particularly, transmitters and receivers for use in multi-user ultra wideband (UWB) communication systems.

BACKGROUND

In multi-user wireless communication systems, such as wireless local area networks, satellite communications and mobile phone networks, multiple transmitters and receivers may communicate simultaneously through a common wireless communication medium. One communication format with attractive features for high data rates and low power consumption is ultra wideband (UWB), also known as impulse radio (IR), in which the transmitter generates a train of ultra short pulses spreading the energy of the transmitted signal across an ultra wide bandwidth. IR technology employing time-hopping (TH) codes pseudo randomly spreads pulses in time, and is often referred to IR multiple access (IRMA).

In general, IRMA applies a TH code chosen from a set of orthogonal "spreading codes" to an outbound stream of "symbols." Each IRMA pulse transmits a "symbol" representing a discrete information bearing value selected from a finite set ("alphabet"). For example, simple alphabets used by transmitters may be $\{+1, -1\}$ or $\{-3, -1, +1, +3\}$. TH codes apply a finite set of integer values to time shift a sequence of transmitted pulses and produce a set of "chips" for each value to be transmitted. Each TH code has a sequence, resulting in each IRMA pulse train having a defined time period. The resulting chips are transmitted according to some modulation scheme, such as pulse position modulation (PPM). In order to separate signals from multiple users, the receivers isolate the signal of the desired user by matching the user's signal to the corresponding orthogonal spreading code associated with that user.

IRMA systems often operate in dense multi-path environments. IR signaling provides resolvable multi-path components and enables collecting energy from multi-path propagation with appropriate receiver design. However, when multiple users are present, the multi-path propagation also induces multi-user interference (MUI). In addition, the communication channel between the transmitter and the receiver can also become "frequency selective" in that certain frequencies exhibit fading, i.e. significant loss of signal. Consequently, inter-symbol interference (ISI) in which the transmitted symbols interfere with each other destroys the orthogonality of the waveforms at the receiver. MUI, together with ISI, can cause the receiver to be unable to correctly separate the multi-user waveforms, eventually leading to data loss and/or bandwidth and power inefficiencies.

Various "multi-user detectors" have been developed for separating non-orthogonal UWB multi-user waveforms. These multi-user detectors, however, are often complex and expensive to implement in typical mobile communication devices, and typically require knowledge of the characteristics of the current communication channel. For example, linear detectors, such as decorrelating and minimum mean-squared error (MMSE) detectors, often require inversion of large matrices with size increasing in proportion to the square of the number of users, while optimum maximum likelihood (ML) detectors entail exponential complexity. In addition, some analog IRMA systems approximate MUI as Gaussian noise and attempt to suppress it statistically. Such systems require successful application of strict power control and rely on the Gaussian approximation. However, when the number of users is not sufficiently large, the Gaussian approximation is not valid.

SUMMARY

In general, techniques are described for deterministically substantially eliminating multi-user interference (MUI) in multi-user wireless communication systems, such as ultra wideband (UWB) systems Unlike conventional IRMA systems in which MUI is approximated as Gaussian noise and rely on time-hopping (TH) spreading codes to statistically suppress MUI, "multi-stage block-spreading" (MS-BS) techniques are described that eliminate MUI deterministically at the receiver by preserving the orthogonality between different users waveforms through multi-path channels. Furthermore, the techniques described herein allow a larger number of users than conventional IRMA systems and can provide different users with variable transmission rates.

In one embodiment, the invention is directed to a method which generates a stream of frames from blocks of information bearing symbols wherein the frames corresponding to different blocks of the symbols are interleaved and generates a stream of chips from the stream of frames, wherein the chips corresponding to different frames are interleaved. An ultra wideband (UWB) transmission signal is output from the stream of chips. The stream of frames is generated by parsing the symbols into blocks of K symbols, applying an orthogonal set of spreading codes to the blocks of K symbols to form Q frames, and interleaving the Q frames to form the stream of frames. The stream of chips is generated by applying an orthogonal set of time-hopping spreading codes to the interleaved frames to generate a plurality of chips for each frame, and interleaving each of the plurality of chips to form the output stream of chips.

The method may further assign each of the set of spreading codes to a different user of a group of users and assign each user of the group a common one of the time-hopping spreading codes. Unique addresses are assigned to users as unique pair-wise combinations of the set of orthogonal spreading codes and the set of time-hopping spreading codes.

In additional embodiments, the method receives the output signal and outputs a stream of estimate symbols from the signal using a two-stage de-spreading unit having a time-hopping de-spreading module and a multi-user de-spreading module.

In another embodiment, the invention is directed to a wireless communication device having a multiple-user block-spreading unit that generates a set of frames for respective blocks of information bearing symbols and produces a stream of frames in which the frames from different sets are interleaved, a time-hopping block-spreading unit that generates a set of chips for each frame and outputs a stream of chips in which the chips generated from different frames are interleaved, and a pulse shaping unit to output an UWB transmission signal from the stream of interleaved chips.

In yet another embodiment, the invention is directed to a wireless communication device having a two-stage de-spreading unit that processes a received ultra wideband (UWB) transmission signal to produce estimate symbols, wherein the received UWB signal comprises a multi-user block-spread UWB signal formed from interleaved symbol frames and interleaved chips within the symbol frames.

In additional embodiments, the invention is directed to a system having a wireless transmitter to transmit an ultra wideband (UWB) signal according to interleaved chips generated from interleaved frames produced by blocks of information bearing symbols and wireless receiver to receive the UWB signal and de-interleave the chips and frames to produce estimate symbols.

In another embodiment, the invention is directed to a computer-readable medium containing instructions. The instructions cause a programmable processor of a wireless communication device to generate a stream of frames from blocks of information bearing symbols, wherein the frames corresponding to different blocks of the symbols are interleaved, generate a stream of chips from the stream of frames, wherein the chips corresponding to different frames are interleaved, and output an UWB transmission signal from the stream of chips.

The multi-stage block-spreading techniques described herein may offer one or more advantages. For example, MS-BS preserves the orthogonality of a transmitted UWB signal through a multi-user communication channel. Consequently, transmitted signals are resistant to MUI regardless of the underlying frequency selective nature of the multi-path communication channel without using adaptive power control to dynamically adjust the usage of power by transmitter. As a result, the techniques render the multiple access communication channel equivalent to a set of independent parallel single-user frequency-selective channels with additive white Gaussian noise (AWGN). In other words, because the transmitted signals remain orthogonal, IRMA receivers may be implemented with single-user detectors, which are less complex than multi-user detectors. Furthermore, the receiver can be implemented in favor of low complexity or high performance.

Other advantages of the described techniques may include improved bandwidth efficiency, which implies that information can be transmitted at higher rates and that the maximum allowable number of simultaneous users increases. Furthermore, as the number of users increases, an IRMA system that incorporates the described techniques may be more resilient to degradation in bit-error-rate (BER) performance than conventional IRMA systems.

The details of one or more embodiments of the invention are set forth in the accompanying drawings and the description below. Other features, objects, and advantages of the invention will be apparent from the description and drawings, and from the claims.

DETAILED DESCRIPTION

The techniques described herein use notation defined as follows. Bold upper case letters and lower case letters denote matrices and column vectors respectively. $(\ )^T$ and $(\ )^H$ denote transpose and Hermitian transpose respectively. $\delta(\ )$ and $\otimes$ stand for Kroenecker's delta and Kronecker's product respectively. E { } denotes expectation. $\lfloor\ \rfloor$ and $\lceil\ \rceil$ denote integer floor and integer ceiling respectively. $I_K$ denotes the identity matrix of size K and $0_{M \times N}$ denotes an all zero matrix of size M×N.

Figure 1:
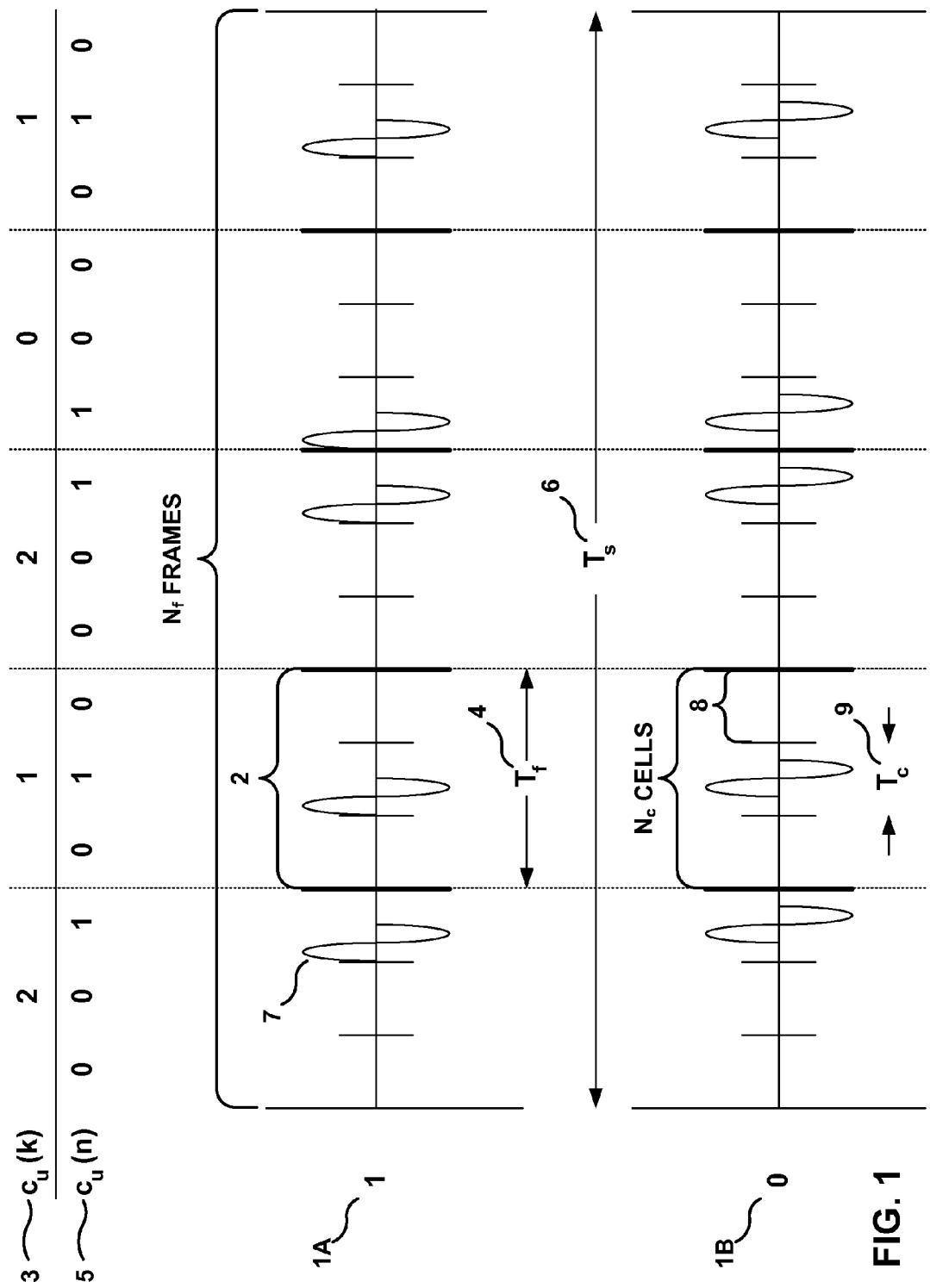
FIG. 1 is a timing diagram illustrating an example time-hopping (TH) pulse position modulation (PPM) scheme in an impulse radio multiple access (IRMA) system.

FIG. 1 is a timing diagram that illustrates an example transmission of two separate symbols, 1(1A) and 0(1B), using binary pulse position modulation (PPM) in an impulse radio multiple access (IRMA) format. Generally, the PPM-IRMA format described herein is designed such that the PPM delays are sufficiently large to ensure orthogonal modulation using M-ary PPM. As a result, a nonlinear PPM-IRMA format can be viewed as a linearly modulated code-division multiple access (CDMA) format.

Each symbol 1A, 1B represents a discrete information bearing value selected from a finite set ("alphabet"), e.g. {1, 0}. Symbols 1A, 1B are repeated over $N_f$ frames, e.g. $N_f$=5, with each frame 2 having duration $T_f$ 4. During signaling interval $T_s$ 6 of duration $T_s = N_f T_f$ seconds, $k_b = \log_2 M$ message bits having bit rate $R_b$ may be loaded into a $k_b$-bit buffer. The resulting $k_b$-bit output symbol rate is $R_s = R_b/k_b$. For example, the $u^{th}$ user's information bearing symbol transmitted during the $k^{th}$ frame is denoted $I_u(\lfloor k/N_f \rfloor)$ where $I_u(\lfloor k/N_f \rfloor) \in [M-1]$.

The application of a time-hopping (TH) spreading code to the information bearing symbols produces a set of "chips" over which each symbol 1A, 1B is transmitted. Each frame 2 comprises $N_c$, e.g. $N_c$=3, chips with each chip 8 having chip duration $T_c$ 9. Frame duration $T_f$ is then equivalent to $N_c T_c + T_g$, where $T_g$ is a guard time to account for processing delay at the receiver between two successively received frames. For simplicity $T_g$ is set to zero for all following equations. A nonzero value for $T_g$ does not impose any limiting consequences. The $u^{th}$ user's transmitted waveform $v_u(t)$ is given in accordance with equation (1):

$$v_u(t) = P_u \sum_{-\infty}^{+\infty} w\left(t - kT_f - c(k)T_c - \tau_{j_u(\lfloor k/N_f \rfloor)}\right) \quad (1)$$

where $P_u$ is the $u^{th}$ user's transmission power, w(t) denotes the ultra-short pulse 7 and $\dot{c}_u(k)\epsilon[0, N_c-1]$ 3 is a periodic pseudo random sequence with period $P_{\dot{c}}$ equal to $N_f$. Ultra-short pulse 7 typically has a duration between 0.20 and 2.0 nanoseconds and may be selected as a Gaussian monocycle, a Gaussian biphase monocycle, a doublet consisting of a positive Gaussian pulse followed by its negative, and the like. The role of $\dot{c}_u(k)$ 3 is to enable both multiple users over a communication channel and security.

Each signaling interval $T_s$ 6 of the transmitted waveform in equation (1) includes $N_f$ copies of a single symbol 1A, 1B, i.e. one per frame 2, with pulse 7 time-shifted in each frame 2 according to the symbol value, e.g. it is shifted by $\tau_m$ for $I_u(\lfloor k/N_f \rfloor)=m$ where $m \epsilon[0, 1, \ldots, M-1]$. In order to ensure orthogonal modulation, PPM modulation delays $\tau_m$ must satisfy $\tau_m - \tau_{m-1} \geq T_w$ for $\forall m \epsilon [1, 2, \ldots, M-1]$. Thus, chip duration $T_c$ 9 should be chosen to satisfy $T_c \geq \tau_{m-1} + T_w \geq MT_w$.

The orthogonal M-ary PPM of the $u^{th}$ user can be viewed as having M parallel branches with each parallel branch realizing a shifted version of the pulse stream. Consequently, in order to generate the waveform $v_u(t)$ as given in equation (1), only one branch out of the M parallel branches needs to be selected depending on the symbol value. Summing the M parallel branches, waveform $v_u(t)$ can be rewritten in terms of waveform $v_{u,m}(t)$ as given in equations (2) and (3) respectively.

$$v_u(t) = \sum_{m=0}^{m=M-1} v_{u,m}(t) \quad (2)$$

$$v_{u,m}(t) = P_u \sum_{k=-\infty}^{k=+\infty} s_{u,m}(\lfloor k/N_f \rfloor) w(t - kT_f - c(k)T_c - \tau_m) \quad (3)$$

The waveform $s_{u,m}(\lfloor k/N_f \rfloor) := \delta(I_u(\lfloor k/N_f \rfloor) - m), \forall m \epsilon [0, M-1]$ (12). Equation (3) can be rewritten as equation (4) by defining monocycles 7 as pulse functions $w_m(t) := w(t - \tau_m)$ and using the substitution $T_f = N_c T_c$.

$$v_{u,m}(t) = P_u \sum_{k=-\infty}^{k=+\infty} s_{u,m}(\lfloor k/N_f \rfloor) w_m(t - (kN_c + c(k))T_c) \quad (4)$$

Because $\dot{c}_u(k) \epsilon [0, N_c-1]$ 3 is an integer, $w_m(t)$ is shifted by an integer multiple of $T_c$ 9. As a result waveform $v_{u,m}(t)$ can be written in equation (5) accordingly. Equation (5) can be viewed as a linearly modulated waveform with symbol rate $R_s = 1/T_c$ while equation (2) can be viewed as the superposition of M linear modulators, each with a different pulse function $w_m(t)$.

$$v_{u,m}(t) = P_u \sum_{k=-\infty}^{k=+\infty} v_{u,m}(n) w_m(t - nT_c) \quad (5)$$

Sequence $v_{u,m}(n)$ is dependent on $s_{u,m}(k)$ and $\dot{c}_u(k)$ 3. Chip-rate code sequence $c_u(n)$ 5 with period $P_c = N_c P_{\dot{c}}$ is defined via $\dot{c}_u(k)$ 3 as given in equation (6).

$$c_u(n) := \delta(\lfloor n/N_c \rfloor N_c + c_u(\lfloor n/N_c \rfloor) - n) \quad (6)$$

The relation between $\dot{c}_u(k)$ 3 and $c_u(n)$ 5 is given by the mapping between chip index n and frame index k. As a result, the $u^{th}$ user's chip sequence on the $m^{th}$ branch $v_{u,m}(n)$ can be expressed according to equation (7).

$$v_{u,m}(n) = s_{u,m}(\lfloor n/N_c N_f \rfloor) c_u(n) \quad (7)$$

Sequence $s_{u,m}(\lfloor n/(N_c N_f) \rfloor)$ does not change over the duration of $N_f N_c$ chips ($N_f T_f$ seconds) and is spread by $c_u(n)$ 5 in equation (2) to generate chip sequence $v_{u,m}(n)$ in equation (7). From this chip-rate sampled model, the nonlinearly modulated PPM-IRMA format can be viewed as a linearly modulated code-division multiple access (CDMA) format.

Although $T_g$ was set equal to zero, the model can also include $T_g$ as nonzero. This can be accomplished by setting $T_g = N_g T_c$ with $N_g$ being an integer and restricting $\dot{c}(k)$ 3_ to take on values $[0, N_c'-1]$, where $N_c' := N_c - N_g$. Hereafter, all equations and derivations will assume $T_g = 0$.

Figure 2:
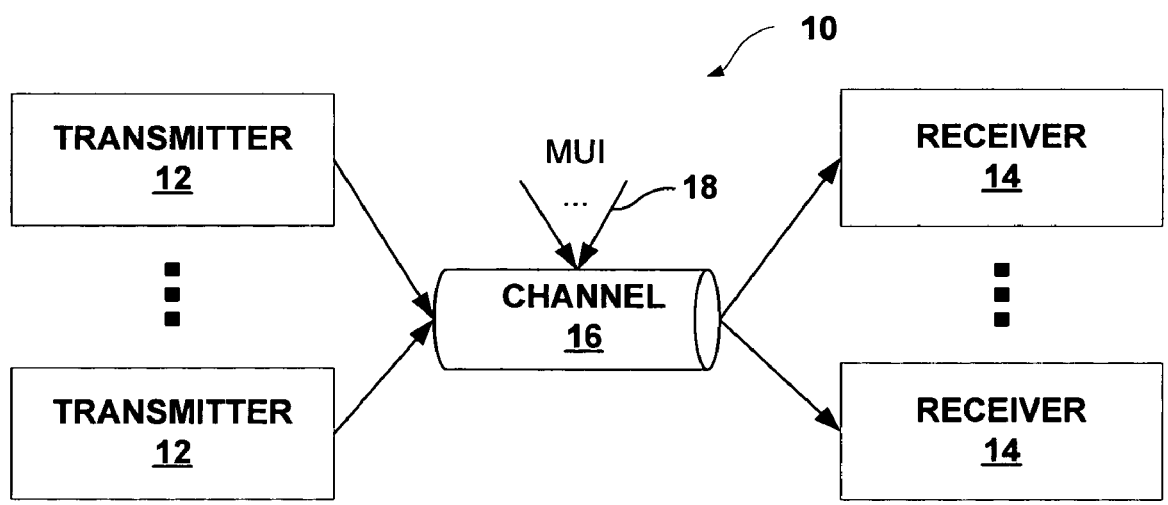
FIG. 2 is a block diagram illustrating a wireless system impulse radio multiple access (IRMA) format in which multiple transmitters communicate with multiple receivers through a channel.

FIG. 2 is a block diagram illustrating multi-user wireless communication system 10 in which multiple transmitters 12 communicate with receivers 14 through wireless channel 16 via the M-ary PPM-IRMA format described in FIG. 1. In general, the invention provides techniques for deterministically substantially eliminating multi-user interference (MUI) 18 in communication system 10 that could be introduced in waveforms produced by transmitters 12 during transmission through communication channel 16.

Transmitters 12 transmit information using techniques referred to herein as "multi-stage block-spreading" (MS-BS). MS-BS generates a stream of frames from blocks of information symbols wherein the frames corresponding to different blocks of the symbols are interleaved and a stream of chips is generated from the stream of frames wherein the chips corresponding to different frames are interleaved. Transmitters 12 output a UWB transmission signal from the stream of chips.

The stream of frames is generated by applying an orthogonal set of spreading codes, such as direct sequence CDMA codes, TDMA codes, or FDMA codes, while the stream of chips is generated by applying an orthogonal set of TH spreading codes. The stream of chips may be padded with a number of guard chips determined as a function of length of channel 16. The set of spreading codes and the set of TH spreading codes are mutually exclusive so that the interleaved and padded chips retain their orthogonality after passing through channel 16. Each user of a group of users is assigned a spreading code from the set of spreading codes and is also assigned a common TH spreading code from the set of TH spreading codes. System 10 supports a total number of users determined by the product of the number of frames over which an information symbol is repeated $N_f$ and the number of chips in each frame $N_c$.

MS-BS techniques preserve the orthogonality between different users signals through communication channel 16 regardless of the underlying frequency selective nature of the multi-path communication channel thereby rendering channel 16 equivalent to a set of independent parallel single-user frequency-selective channels with additive white Gaussian noise (AWGN).

Receivers 14 receive the UWB transmission signal output by transmitters 12 and output a stream of estimate symbols from the received signal using a two-stage de-spreading unit having a TH de-spreading module and a multi-user de-spreading module. The stream of output symbols is generated by converting the received signal to a stream of chips and applying a first de-spreading matrix with the TH de-spreading module to de-interleave the chips into blocks of frames. The multi-user de-spreading module applies a second de-spreading matrix to the blocks of frames to de-interleave the frames and produce blocks of estimate symbols. A single user detection scheme is applied to the blocks of estimates symbols to output the stream of the estimate symbols.

These techniques work with existing communication systems using IRMA with orthogonal M-ary pulse position modulation (PPM) to eliminate MUI 18 deterministically at receivers 14 and apply to uplink and downlink transmissions, i.e., transmissions from a base station to a mobile device and vice versa. Transmitters 12 and receivers 14 may be any device configured to communicate using a multi-user wireless transmission including a hub for a wireless local area network, a cellular phone, a laptop, handheld computing device, a personal digital assistant (PDA), or a cellular distribution station, and the like.

The techniques described herein may be applied to uplink and/or downlink transmissions, i.e., transmissions from a base station to a mobile device and vice versa. Consequently, transmitter 12 and receiver 14 may be any device configured to communicate using a multi-user ultra wideband wireless transmission including a distribution station, a hub for a wireless local area network, a mobile phone, a laptop or handheld computing device, a personal digital assistant (PDA), a device within a wireless personal area network, a device within a sensor network, or other device.

Figure 3:
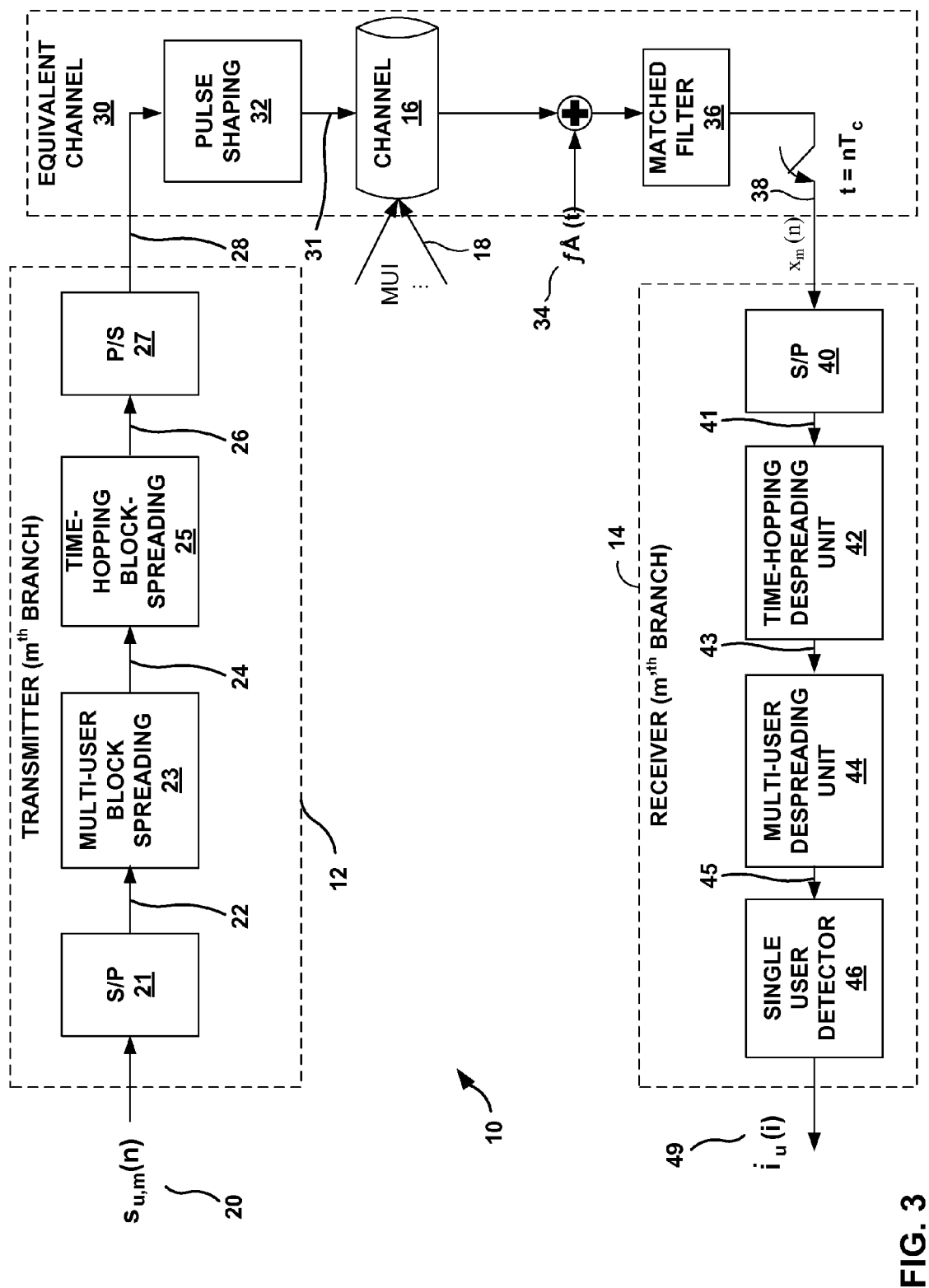
FIG. 3 is a block diagram illustrating in further detail the multi-user UWB communication system of FIG. 2.

FIG. 3 is a block diagram illustrating in further detail multi-user communication system 10 of FIG. 2 using multi-stage block-spreading (MS-BS). For simplicity, the $m_{th}$ branch of a transmitter 12 and the $m^{th}$ branch at a receiver 14 are given in detail for the $u^{th}$ user. Transmitter 12 applies MS-BS techniques and pulse shaping to chip-rate information bearing symbols $s_{u,m}(n)$ 20 and transmits the MS-BS M-ary pulse position modulated (PPM) IRMA waveform $v_{u,m}(t)$ 28. Receiver 14 receives chip-rate sampled sequence $x_m(n)$ 38 and outputs symbol estimates 49.

Generally, multiple transmitters 12 corresponding to different users assign each user a unique spreading code from a set of orthogonal spreading codes, such as direct sequence CDMA codes TDMA codes, or FDMA codes. Additionally each user is assigned a TH spreading code from a set of orthogonal spreading codes such that within a group of users, each user with a unique orthogonal spreading code is also assigned a common TH spreading code. Therefore, a unique address $\{u_A, U_B\}$ can be assigned to each user with the first index of the address indicating the TH code assigned to the $u^{th}$ user and the second index indicating the orthogonal spreading code assigned to the $u^{th}$ user.

Serial to parallel (S/P) converter 21 of transmitter 12 parses serial chip-rate data stream $s_{u,m}(n)$ 20 into blocks of K symbols 22, each symbol representing a discrete information bearing value, as defined in equation (8).

$$s_{u,m}(i):=[s_{u,m}(iK), \ldots, s_{u,m}(iK+K-1)]^T \quad (8)$$

As described in detail below, multi-user block-spreading unit 23 applies an orthogonal spreading code according to the address assigned to the $u^{th}$ that generates a stream of Q frames from blocks of K information bearing symbols and interleaves the frames corresponding to different blocks of the symbols. Each block of K symbols is spread into $N_fK \times 1$, where $N_fK=Q$, output vectors 24 according to equation (9) via $Q \times K$ spreading matrix $D_{uB}$ given in equation (10).

$$\check{s}_{u,m}(i)=D_{uB}s_{u,m}(i), \text{ where } \check{s}_{u,m}(i):=[\tilde{s}_{u,m}(iQ), \ldots, \tilde{s}_{u,m}(iQ+Q-1)]^T \quad (9)$$

$$D_{uB}:=d_{uB} \otimes I_K \quad (10)$$

In other words, the K symbol blocks are symbol-spread into Q frame-rate signals and then frame-interleaved to provide data stream 24 according to equation (9). In rewriting equation (9), it can be seen multi-user block-spreading unit 23 implements a multi-code transmitter with K codes per user as given in equation (11).

$$\check{s}_{u,m}(i) = \sum_{k=0}^{k=K-1} s_{u,m}(iK+k)d_{uB}^{(k)} \quad (11)$$

Each column of spreading matrix $D_{uB}$ can be viewed as a separate spreading code for the $u^{th}$ user, with the $(k+1)^{st}$ column denoted by $d_{uB}^{(k)}$.

Similarly, TH spreading unit 25 applies a TH spreading code selected from a set of mutually orthogonal TH spreading codes according to the address assigned to the $u^{th}$ user. Each block of Q frame-rate signals of data stream 24 is spread into a stream of P chips wherein the chips corresponding to different frames are interleaved. In other words, TH block-spreading unit 25 spreads a block of Q frame-rate signals into P chip-rate signals followed by chip interleaving and zero padding via spreading matrix $C_{uA}$ according to equation (12).

$$v_{u,m}(i)=C_{uA}\check{s}_{u,m}(i) \quad (12)$$

TH spreading matrix $C_{uA}$ is derived from equations (13, 14) and defined in equation (15).

$$c_{uA}^{(q)}:=[c_{uA}(qN_c), c_{uA}(qN_c+1), \ldots, c_{uA}(qN_c+N_c-1)]^T, \text{ for } q \in [0, N_f-1] \quad (13)$$

Recall that $C_{uA}$ is given by equation (6). Matrix $C_{uA}(q)$ is defined in equation (14).

$$C_{uA}^{(q)}:=c_{uA}^{(q)} \otimes T_{zp}, \text{ where } T_{zp}:=[I_K, 0_{K \times L}]^T \text{ for } \quad (14)$$

Zero-padding matrix $T_{zp}$ is a $(K+L) \times K$ matrix and appends L zeros at the end of each column upon multiplication. The guard chips may be null values as implemented here with zero padding via matrix multiplication. TH spreading matrix $C_{uA}$ can then be written as in equation (16).

$$C_{uA}:=diag\{C_{uA}^{(0)}, C_{uA}^{(1)}, \ldots, C_{uA}^{N_f-1}\} \quad (15)$$

TH spreading matrix $C_{uA}$ is of size $P \times Q$, where $P=N_fN_c(K+L)$. The parameter L is determined by the effective length of channel 16 in discrete time and is calculated below. As a result, data stream 26 at the output of TH block-spreading unit 25 is given by the $P \times 1$ vector on the $m^{th}$ branch in equation (16) and is given in matrix-vector form according to equation (17).

$$v_{u,m}(i):=[v_{u,m}(iP), \ldots, v_{u,m}(iP+P-1)]^T \quad (16)$$

$$v_{u,m}(i)=C_{uA}D_{uB}s_{u,m}(i) \quad (17)$$

At the output of the two-stage MS_BS parallel to serial (P/S) converter 27 parses blocks of P chips into serial data stream $v_{u,m}(n)$ 28. MS-BS techniques may also offer different users variable transmission rates. Assigning the $u^{th}$ user a set of $A_u$ MU and TH address pairs denoted by $\omega_u$ allows equation (17) to be rewritten as equation (18).

$$v_{u,m}(i) = \sum_{\{\omega_A,\omega_B\}\in\Omega_u} C_{\omega A} D_{\omega B} s_{u,m}^{\{\omega_A,\omega_B\}}(i) \quad (18)$$

In other words, the $u^{th}$ user can transmit $A_u$ symbol blocks of length K simultaneously, each carried on a distinct address pair $\{\omega_A,\omega_B\}\in\Omega_u$. Consequently, the $u^{th}$ user can transmit a total number of $K_u=A_u K$ symbols during each burst of $PT_c$ seconds with a corresponding transmission rate $R_u=K_u/(PT_c)$. In order to avoid address collisions and guarantee deterministic symbol block separation, the address must be assigned such that additional conditions (19, 20) are satisfied.

$$\bigcup_u \Omega_u \in \Omega, \forall u \in [0, N_u - 1] \quad (19)$$

$$\Omega_u \cap \Omega_\mu = \emptyset, \forall u, \mu \in [0, N_u - 1], \text{ and } u \neq \mu \quad (20)$$

Data stream 28 propagates through equivalent channel 30 which includes pulse shaper 32, physical channel 16, AWGN noise 34, and matched filter 36. Pulse shaper 32 converts serial data stream 28 to the analog transmitted signal 31 $v_{u,m}(t)$ by varying the interval between pulses according to the data being modulated and according to the assigned TH spreading code by applying previously defined pulse shaping functions, $w_m(t):=w(t-\tau_m)$. Analog signal 31 propagates through multi-path frequency selective physical channel 16, denoted $g_u(t)$ in which AWGN 34 is added to the signal and is filtered by matched filter 36 on the $m'^{th}$ branch, $\overline{w}_m(t)$, matched to $\overline{w}_m(t)$ where $m'\in[0, M-1]$.

The chip-sampled discrete time equivalent finite impulse response (FIR) channel can be represented according to equation (21) where * denotes convolution.

$$h_{u,m',m}(l):=(w_m*g_u*\overline{w}_{m'})(t)|_{t=lT_c} \quad (21)$$

Equivalent FIR channel of equation (21) of order $L_u$ includes the $u^{th}$ user's asynchronism in the form of delay factors as well as transmit-receive filters, and the multi-path effects. AWGN 34, denoted $\eta(t)$, is effectively sampled at chip-rate, $t=nT_c$, and can be represented as sampled AWGN noise according to equation (22).

$$\eta_m(n):=(\eta*\overline{w}_{m'})(t)|_{t=nT_c} \quad (22)$$

Receiver 14 receives the chip-sampled matched filter output 38 from matched filter 36 as given in equation (23).

$$x_{m'}(n) = \sum_{u=0}^{N_u-1}\sum_{m=0}^{M-1}\sum_{l=0}^{L} P_u h_{u,m',m}(l)v_{u,m}(n-l) + \eta_{m'}(n) \quad (23)$$

$N_u$ is the number of users, L is the maximum length of communication channel 16 in discrete time for the $u^{th}$ user, and M is the number of PPM pulse shapers.

Asynchronism among users in the uplink of a quasi-synchronous system, i.e. a system in which there is a coarse timing reference, is limited to a few chip intervals. The maximum asynchronism, $\tau c_{max,a}$, arises between the nearest and the farthest mobile users and the maximum multi-path spread, $\tau_{max,s}$, can be found using field measurements from the operational environment. The maximum channel order can then be determined by equation (24).

$$L=\lceil(\tau_{max,s}+\tau_{max,a})/T_c\rceil \quad (24)$$

The downlink model, e.g. from the base station to user of interest $\mu$, is subsumed by the uplink model presented above by setting $h_{u,m',l}(l)=h_{u,m',l}(l)$, $\forall u\in[0, N_u-1]$, since the latter allows for distinct user channels. Downlink transmissions are synchronous with $\tau_{max,a}=0$ and maximum channel order L depends only on $\tau_{max,s}$ through $L=\lceil(\tau_{max,s}/T_c)\rceil$. The only channel knowledge assumed at transmitters 12 in the uplink or downlink model is L.

At receiver 14, serial to parallel unit 40 converts chip-rate sampled sequence 38 into P×1 blocks 41 as given in equation (25).

$$x_m(i):=[x_m(iP), x_m(iP+1), \ldots, x_m(iP+P-1)]^T \quad (25)$$

Chip-rate sampled blocks 41 are received in the presence of P×1 noise blocks given in equation (26).

$$\eta_m(i):=[\eta_m(iP), \eta_m(iP+1), \ldots, \eta_m(iP+P-1)]^T \quad (26)$$

Allowing $H_{u,m',m,0}$ to be the P×P lower triangular Toeplitz matrix with first column $[h_{u,m',m}(0), \ldots, h_{u,m',m}(L), 0, \ldots, 0]^T$ and $H_{u,m',m,1}$ be the P×P upper triangular Toeplitz matrix with first row $[0, \ldots, 0, h_{u,m',m}(L), \ldots, h_{u,m',m}(1)]^T$ the input-output block relationship through equivalent channel 30 can be described in matrix form according to equation (27).

$$x_{m'}(i) = \sum_{u=0}^{N_u-1}\sum_{m=0}^{M-1} P_u[H_{u,m',m,0}v_{u,m}(i) + \\ H_{u,m',m,1}v_{u,m}(i-1) + \eta_{m'}(i) \quad (27)$$

With $v_{u,m}(i)$ as defined in equation (17) and making use of the mathematical address assigning rules defined below, equation (27) can be rewritten as given in equation (28).

$$x_{m'}(i) = \sum_{u_A=0}^{N_c-1}\sum_{u_B=0}^{N_f-1}\sum_{m=0}^{M-1} P_u[H_{u,m',m,0}C_{uA}D_{uB}s_{u,m}(i) + \\ H_{u,m',m,1}C_{uA}D_{uB}s_{u,m}(i-1) + \eta_{m'}(i) \quad (28)$$

The $s_{u,m}(i-1)$ dependent term in equation (28) accounts for inter-block interference (IBI) and will be shown to equal a $0_{P\times1}$ matrix.

Receiver 14 performs multi-user separation on the P×1 chip rate sampled blocks 41 by applying de-spreading matrices $\check{C}_{uA}$ and $\check{D}_{uB}$ in TH de-spreading unit 42 and multi-user de-spreading unit 44 respectively. $P\times N_f(K+L)$ TH de-spreading matrix $\check{C}_{uA}$ and $N_f(K+L)\times(K+L)$ multi-user de-spreading matrix $\check{D}_{uB}$ are given in equations (29, 30) respectively.

$$\check{C}_{uA}:=diag\{\check{C}_{uA}^{(0)}, \check{C}_{uA}^{(1)}, \ldots, \check{C}_{uA}^{N_f-1}\} \quad (29)$$

$$\check{D}_{uB}:=d_{uB}\otimes I_{K+L} \quad (30)$$

TH de-spreading matrix $\check{C}_{uA}$ is similarly derived as $C_{uA}$ from equations (6, 13) and equation (31).

$$\check{C}_{uA}^{(q)}:=c_{uA}^{(q)}\otimes I_{K+L} \quad (31)$$

TH de-spreading unit 42 and MU de-spreading unit 44 perform multi-stage block-de-spreading and enable separation of the $\mu^{th}$ user's signal from superimposed multi-user signals deterministically. TH de-spreading matrix $\check{C}_{uA}$ can be viewed as chip-de-interleaving followed by block-de-spreading. Similarly, multi-user de-spreading matrix $\check{D}_{uB}$ can be viewed as frame-de-interlaving followed by block-de-spreading.

Transceiver pairs $\{C_{uA}, \check{C}_{uA}\}_{uA=0}^{N_e-1}$ and $\{D_{uB}, \check{D}_{uB}\}_{uB=0}^{N_f-1}$ are designed such that superimposed multi-user signals can be separated deterministically regardless of multi-path propagation through frequency selective ISI channels of order L. The properties of the Kronecker product can be used to verify the following mutual orthogonality relationships between any two users u and $\mu$ as given in equations (32-35).

$$C_{uA}^H C_{uA} = \delta(\mu_A - u_A) I_{N_f K} \quad (32)$$

$$\check{C}_{uA}^H \check{C}_{uA} = \delta(\mu_A - u_A) I_{N_f(K+L)} \quad (33)$$

$$D_{uB}^H D_{uB} = N_f \delta(\mu_B - u_B) I_K \quad (34)$$

$$\check{D}_{uB}^H \check{D}_{uB} = N_f \delta(\mu_B - u_B) I_{K+L} \quad (35)$$

The multiple-stage block-de-spreading performed by TH de-spreading unit 42 and multi-user de-spreading unit 44 separate the $\mu^{th}$ user's signal from 41 and output MUI free block according to equation (36)

$$y_{\mu,m}(i) = \check{D}_\mu^H \check{C}_\mu^H A x_m(i), \forall m' \in [0, M-1] \quad (36)$$

MUI free output 45 given by equation (37) can then be input into any single-user detector 46 to eliminate channel effects and output symbol block estimates.

$$y_\mu(i) := [y_{\mu,0}^T(i), y_{\mu,1}^T(i), \ldots, y_{\mu,M-1}^T(i)]^T \quad (37)$$

Equations (36, 37) can be rewritten to explicitly show that the superimposed received signals from multiple users can be separated deterministically regardless of the FIR multi-path channel when choosing transceiver pairs $\{C_{uA}, \check{C}_{uA}\}_{uA=0}^{N_e-1}$ and $\{D_{uB}\check{D}_{uB}\}_{uB=0}^{N_f-1}$. By design, the last L rows of TH spreading matrix $C_{uA}$ are zeros while the nonzero elements of $H_{u,m',m,1}$ appear only in its last L columns. Equations (38, 39) prove IBI interference is deterministically eliminated.

$$H_{u,m',m,1} C_{uA} = 0_{P \times N_f K} \quad (38)$$

$$H_{u,m',m,1} C_{uA} D_{uB} s_{u,n}(i-1) = 0_{P \times 1} \quad (39)$$

Further, equations (43, 44) derived from following equations (40-42) explicitly show that the superimposed received signals from multiple users can be separated deterministically after propagation through FIR multi-path channels. This is due to the design of mutually orthogonal transceiver pairs $\{C_{uA}, \check{C}_{uA}\}_{uA=0}^{N_e-1}$ and $\{D_{uB}\check{D}_{uB}\}_{uB=0}^{N_f-1}$ given in equations (32-35) which preserves the code orthogonality among users. In the following equations $\hat{H}_{u,m',m}$ is a tall Toeplitz matrix of dimension (K+L)×K.

$$\hat{H}_{u,m',m} C_{uA} D_{uB} s_{u,n}(i) = \check{C}_{uA} \check{D}_{uB} \hat{H}_{u,m',m} s_{u,n}(i) \quad (40)$$

$$x_{m'}(i) = \sum_{u_A=0}^{N_c-1} \check{C}_{uA} \sum_{uB=0}^{N_f-1} \check{D}_{uB} \sum_{m=0}^{M-1} P_u [\hat{H}_{u,m',m} s_{u,n}(i) + \eta_{m'}(i)] \quad (41)$$

Equation (41) is derived by substituting equation (39) into equation (28) and using the equality in equation (40) which shows channel matrix $H_{u,m',m,0}$ commutes with TH and MU spreading matrices $C_{uA}$ and $D_{uB}$. Using equations (32-35) and equation (41), equation (36) can be rewritten according to equation (42).

$$y_{\mu,m'}(i) = \check{D}_{\mu B}^H \check{C}_{\mu A}^H \sum_{u_A=0}^{N_c-1} \sum_{uB=0}^{N_f-1} \check{C}_{uA} \check{D}_{uB} \sum_{m=0}^{M-1} P_u [\hat{H}_{u,m',m} s_{u,n}(i) + \check{D}_{\mu B}^H \check{C}_{\mu A}^H \eta_{m'}(i) \quad (42)$$

With the substitution $\acute{\eta}_m(i) := \check{D}_{uB}^H \check{C}_{\mu A}^H \eta_m(i)$ equation (42) can be rewritten as equation (43) which shows the specified user, $\mu$, is separated from MUI via multi-stage block-de-spreading $\check{D}_{\mu B}^H \check{C}_{\mu A}^H$.

$$y_{\mu,m}(i) = N_f P_u \hat{H}_{u\mu,m} s_{u,n}(i) + \acute{\eta}_m(i) \quad (43)$$

Multi-stage block-de-spreading output can be written in equation (44) using MK×1 blocks $s_\mu(i) := [s_{\mu,0}^T(i), s_{\mu,1}^T(i), \ldots, s_{\mu,M-1}^T(i)]^T$. Multi-stage block-de-spreading output $y_{\mu,m}(i)$ and noise $\acute{\eta}(i)$ are M(K+L)×1 vectors generated by concatenating the output blocks from the receiver filters matched to the M waveforms and $\hat{H}_\mu$ is the M(K+L)× MK matrix given by equation (45).

$$y_u(i) = N_f P_u \hat{H}_\mu s_\mu(i) + \acute{\eta}(i) \quad (44)$$

$$\hat{H}_\mu := \begin{bmatrix} \check{H}_{\mu,0,0} & \check{H}_{\mu,0,1} & \cdots & \check{H}_{\mu,0,M-1} \\ \check{H}_{\mu,1,0} & \check{H}_{\mu,1,1} & \cdots & \check{H}_{\mu,1,M-1} \\ \vdots & \vdots & \ddots & \vdots \\ \check{H}_{\mu,M-1,0} & \check{H}_{\mu,M-1,1} & \cdots & \check{H}_{\mu,M-1,M-1} \end{bmatrix} \quad (45)$$

MS-BS accomplished by spreading matrix $D_{uB}$, which is formed by symbol-spreading followed by frame-interleaving, and spreading matrix $C_{uA}$, which is formed by symbol-spreading followed by chip-interleaving and zero padding convert the conventional multi-user detection problem into an equivalent set of single user equalization problems. Similar to multi-path channels with CIBS transmissions, MS-BS cause ISI with each symbol block, but does not cause ICI within the code vector, i.e. ICI is replaced by ISI. Zero padding in the second block-spreading stage eliminates ICI and maintains the orthogonality among the MU and TH spreading stages.

Further, the mutli-user separating front end of receiver 14, i.e. TH and MU de-spreading units 42 and 44 respectively, preserve the maximum-likelihood (ML) optimality. This is shown through equations (46-48) given below.

$$\check{G} := (I_M \otimes \check{C}_{uA})(I_M \otimes \check{D}_{uB}) \text{ where } \check{G} := [\check{G}_0, \check{G}_1, \ldots, \check{G}_{N_f-1}] \quad (46)$$

$$\check{G}^H \check{G} = N_f I_{M(K+L)} \quad (47)$$

$$Pr[x(i) | \{s_u(i)\}_{u=0}^{N_u-1}] = \prod_{u=0}^{N_u-1} Pr[y_u(i) | s_u(i)] \quad (48)$$

Equation (47) implies that if $\eta(i)$ is white, then $\eta'(i)$ remains white and the probability of receiving x(i), where $x(i):=[x_0^T(i), x_1^T(i), \ldots, x_{M-1}^T(i)]^T$, given that $s_u(i)$ is transmitted for each user equals the product of the probabilities of generating $y_u(i)$ given that that $s_u(i)$ is transmitted. In other words, despreading matrices $\check{C}_{uA}$ and $\check{D}_{uB}$ reduce a multi-user detection problem, which operates on MUI and ISI in the presence of frequency selective channels, to an equivalent set of single user equalization problems without loss of ML optimality. As a result, if the $N_u$ single user ISI problems in equation (44) are demodulated in the ML sense using for example, Viterbi's decoding, then computationally demanding multi-user detection is not needed when spreading and despreading matrices, $D_{uB}$, $C_{uA}$ and $\check{C}_{uA}$, $\check{D}_{uB}$, are chosen according to equations (10, 15, 29, 30) respectively.

Single-user detector 46 removes channel effects from output blocks 45 and generates symbol block estimates given in equation (44). For example, linear equalizer $\Gamma_\mu$ outputs symbol block estimates in equation (44) according to equation (49).

$$\hat{s}_\mu(i) = \Gamma_\mu y_u(i) \text{ where } \hat{s}_\mu(i) := [\hat{s}_{\mu,0}^T(i), \hat{s}_{\mu,1}^T(i), \ldots, \hat{s}_{\mu,M-1}^T(i)]^T \quad (49)$$

Single-user detector 46 performs symbol detection on soft estimates given by equation (49) and outputs the $\mu^{th}$ user's K×1 symbol block estimate 49 given by equation (50) according to decisions made by equation (51).

$$\check{I}_\mu := [\check{I}_\mu(iK), \check{I}_\mu(iK+1), \ldots, \check{I}_\mu(iK+K-1)]^T \quad (50)$$

$$\check{I}_\mu(iK + k) = \underset{m}{\operatorname{argmax}} \{\hat{s}_{\mu,m}(iK + k)\}, \text{ for all } m \in [0, M-1] \quad (51)$$

and $k \in [0, K-1]$

Trading off performance for complexity, any other detector may replace the maximum likelihood (ML) Viterbi equalizer, given in equation (44), typically used in multiple user detection. The complexity of ML sequence estimation (MLSE) for M-ary PPM modulation is $O(KM^{L_u})$ per symbol block of size K. Consequently, the per-symbol decoding complexity is $O(M^{L_u})$ regardless of the block size K and the maximum channel order. Depending on how $\Gamma_\mu$ is selected, the linear receivers including a matched filter (MF) receiver, zero-forcing (ZF) receiver, and minimum mean-square error (MMSE) receiver are given in equations (52-54) respectively.

$$\Gamma_\mu^{MF} := \hat{H}_\mu^H / N_f \quad (52)$$

$$\Gamma_\mu^{ZF} := (\hat{H}_\mu^H \hat{H}_\mu)^{-1} \hat{H}_\mu^H / N_f \quad (53)$$

$$\Gamma_\mu^{MMSE} := N_f R_\mu \hat{H}_\mu^H [R_\eta + (N_f)^2 \hat{H}_\mu \hat{H}_\mu^H]^{-1} \quad (54)$$

Equation 54 can be expanded using substitutions according to equations (55, 56).

$$R_\mu := E\{s_\mu(i) s_\mu^H(i)\} \quad (55)$$

$$R_\eta := E\{\eta(i) \eta^H(i)\} \quad (56)$$

In this manner, the techniques allow transceivers to be configured with receivers in favor of low complexity or high performance.

Figure 4:
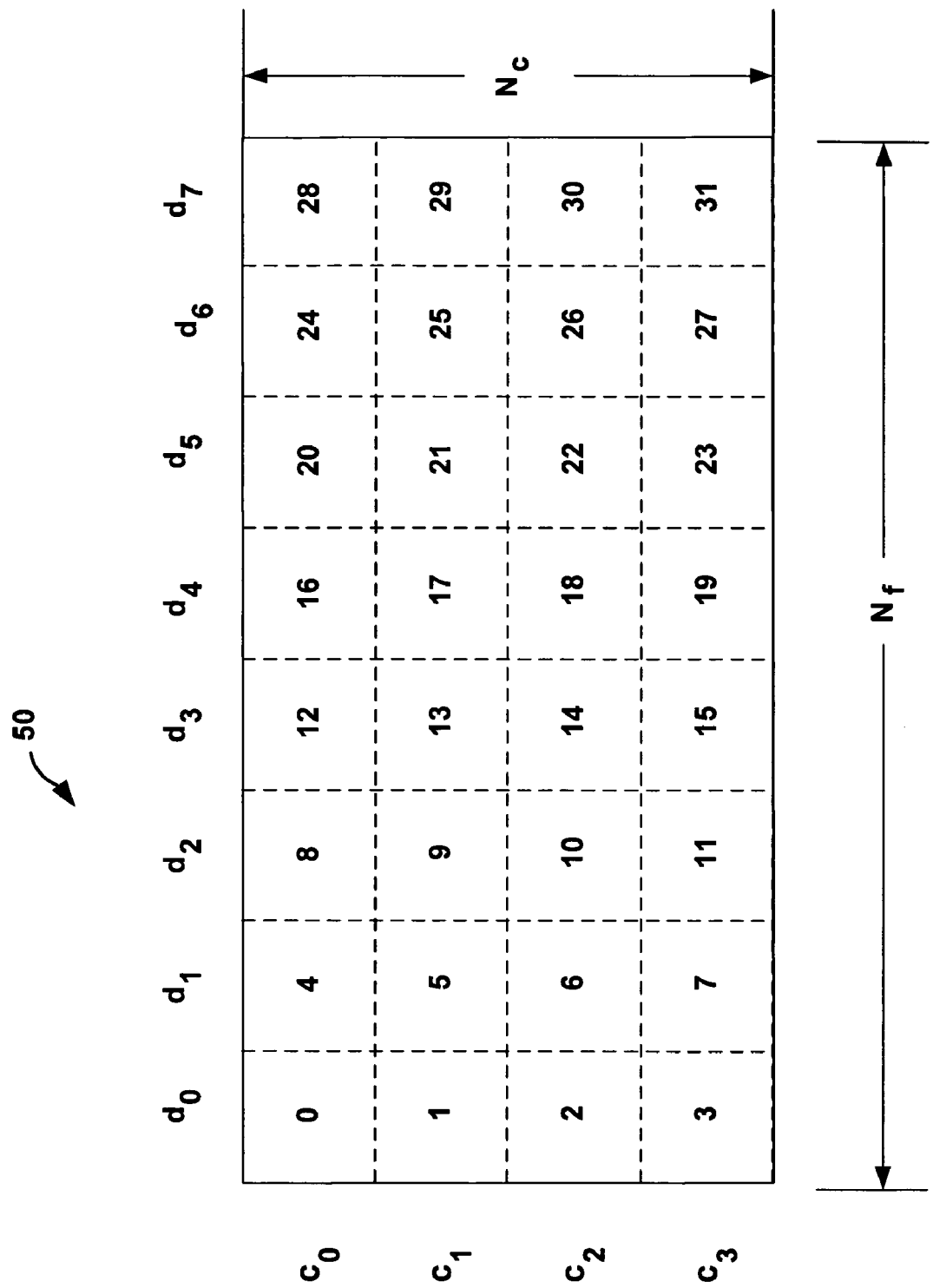
FIG. 4 illustrates an example assignment of multiple users (MU) and time-hopping (TH) addresses.

FIG. 4 illustrates an example $N_c \times N_f$ matrix 50 for assigning the address $\{u_A, u_B\}$ to the $u^{th}$ user with $N_c=4$ and $N_f=8$ of system 10. In order to facilitate separation of multiple users over a multi-path communication channel each user is assigned a TH address and a user-signature pattern that will herein be referred to as a (multi-user) MU address corresponding to a TH spreading code and an orthogonal spreading code respectively. Because communication system 10 uses an M-ary PPM-IRMA format, identical information bearing symbols are transmitted over $N_f$ frames. Consequently, each symbol can be viewed as being encoded with a repetition code. Replacing the repetition code with an orthogonal spreading code specified by a MU address enables $N_u$ users to be uniquely identified. The number of users that can be uniquely identified in an M-ary PPM-IRMA format communication system is given in equation (57).

$$N_u = N_c N_f \quad (57)$$

Matrix 50, therefore, illustrates TH and MU address assignments for a fully loaded system with 32 users. Each user is assigned a TH address vector of length $P_c = N_f$ according to equation (58).

$$\dot{C}_{uA} := [c_{uA}(0), \ldots, c_{uA}(N_c-1)]^T, c_{uA}(n) \in [0, P_c-1] \quad (58)$$

For any two users, u and $\mu$, $\dot{c}_{uA}(n) \neq \dot{c}_{\mu A}(n)$, $\forall n \in [0, P_c-1]$. The number of TH address vectors can at most be $N_c$, i.e. the number of chips in a frame. If the number of active users, $N_u$, is less than $N_c$ then $N_u$ of the $N_c$ TH address vectors can be uniquely assigned to the $N_u$ users. TH spreading codes are specified by a TH address, e.g. the $u_A^{th}$, and defined according to equation (59) with $c_{uA}(n)$ as defined in equation (6).

$$c_{uA} := [c_{uA}(0), c_{uA}(1), \ldots, c_{uA}(P_c-1)]^T, c_{uA}(n) \in [0,1] \quad (59)$$

These TH spreading codes are mutually orthogonal, i.e. $c_{uA}^H c_{\mu A} = N_f \delta(u_A - \mu_A)$, $\forall u_A, \mu_A \in [0, N_c-1]$. Replacing the repetition code with a set of spreading codes orthogonal to the set of orthogonal TH spreading codes allows a group of users with identical TH spreading codes to be uniquely identified. MU spreading codes given by a specific MU address, e.g. the $u_B^{th}$, can be expressed as given in equation (60).

$$d_{uB} := [d_{uB}(0), \ldots, d_{uB}(N_f-1)]^T, d_{uB}(n) \in [1,-1] \quad (60)$$

MU spreading codes are also designed to be mutually orthogonal. Equation (60) is designed such that $d_{uB}^M d_{\mu B} = N_f \delta(u_B - \mu_B)$, $\forall u_B, \mu_B \in [0, N_f-1]$. The repetition encoding of a standard IRMA system can be achieved by setting $d_{uB} = [1, 1, \ldots 1]$.

If the number of $N_u$ users satisfies $N_u \leq N_c N_f$, then a given TH address is assigned to a group of $\lfloor N_u/N_c \rfloor$ or $\lceil N_u/N_c \rceil$ users. An additional set of MU addresses are assigned to be able to resolve users in the same group by employing a unique mapping to each of the $\lfloor N_u/N_c \rfloor$ or $\lceil N_u/N_c \rceil$ users in the same group. As a result, the same MU address can be assigned to several users that belong to different groups since groups are differentiated via their TH address. For example, the $u^{th}$ user may be assigned TH address and MU address with index given by its $\{u_A, u_B\}$ pair according to equations (61, 62) respectively.

$$u_A = u \pmod{N_c} \quad (61)$$

$$u_B = \lfloor u/N_c \rfloor, u \in [0, N_c N_f - 1] \quad (62)$$

Figure 5:
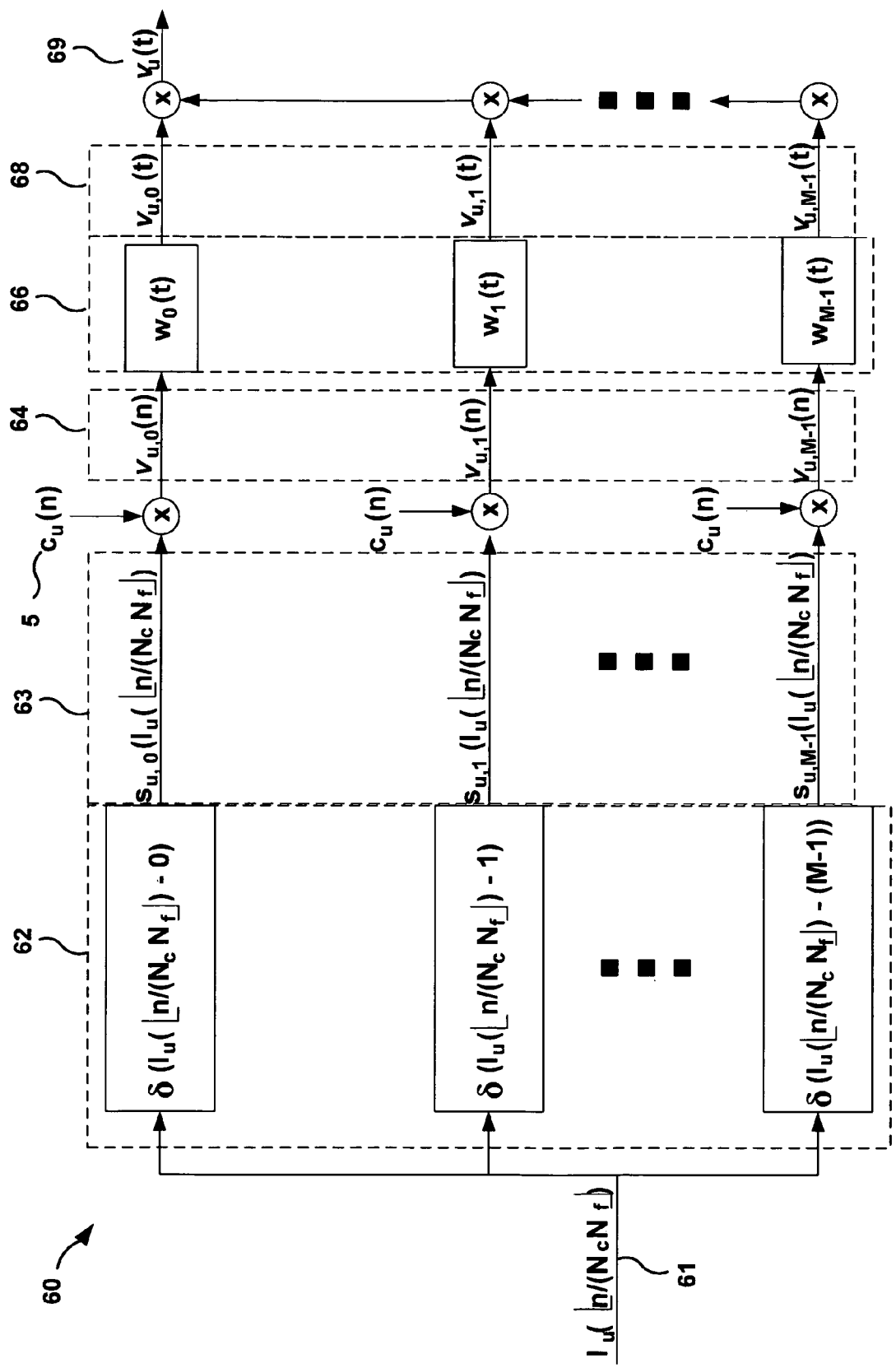
FIG. 5 is a block diagram illustrating an example transmission of a symbol using PPM in an IRMA system.

FIG. 5 is a block diagram that illustrates an example transmission of a M-ary PPM-IRMA signal of the $u^{th}$ user's information bearing symbols during the $n^{th}$ chip duration in an IRMA system 60. The $u^{th}$ user's transmitted symbol during the $n^{th}$ chip duration is $I_u(\lfloor n/N_c N_f \rfloor)$ 61. The orthogonal M-ary PPM of the $u^{th}$ user in FIG. 1 can be viewed as having M parallel branches 62 with each parallel branch realizing a shifted version of the pulse stream. However, one branch out of the M parallel branches can be sufficiently selected depending on the symbol value.

The information stream, and thus $s_{u,m}(\lfloor n/(N_c N_f) \rfloor)$ 63, does not change over the duration of $N_f N_c$ chips ($N_f T_f$ seconds) and is spread by TH chip-rate sequence 5 as defined in equation (6) to generate chip sequence 64 in equation (7). From this chip-rate sampled model, the nonlinearly modulated PPM-IRMA format can be viewed as a linearly modulated multiple access format such as CDMA, TDMA, or FDMA. The chip-rate sampled signal 64 is pulse shaped and converted to an analog signal 68 by functions 66. The sum of the M branches of the nonlinearly modulated PPM-IRMA signal are summed together to form signal 69.

Figure 6:
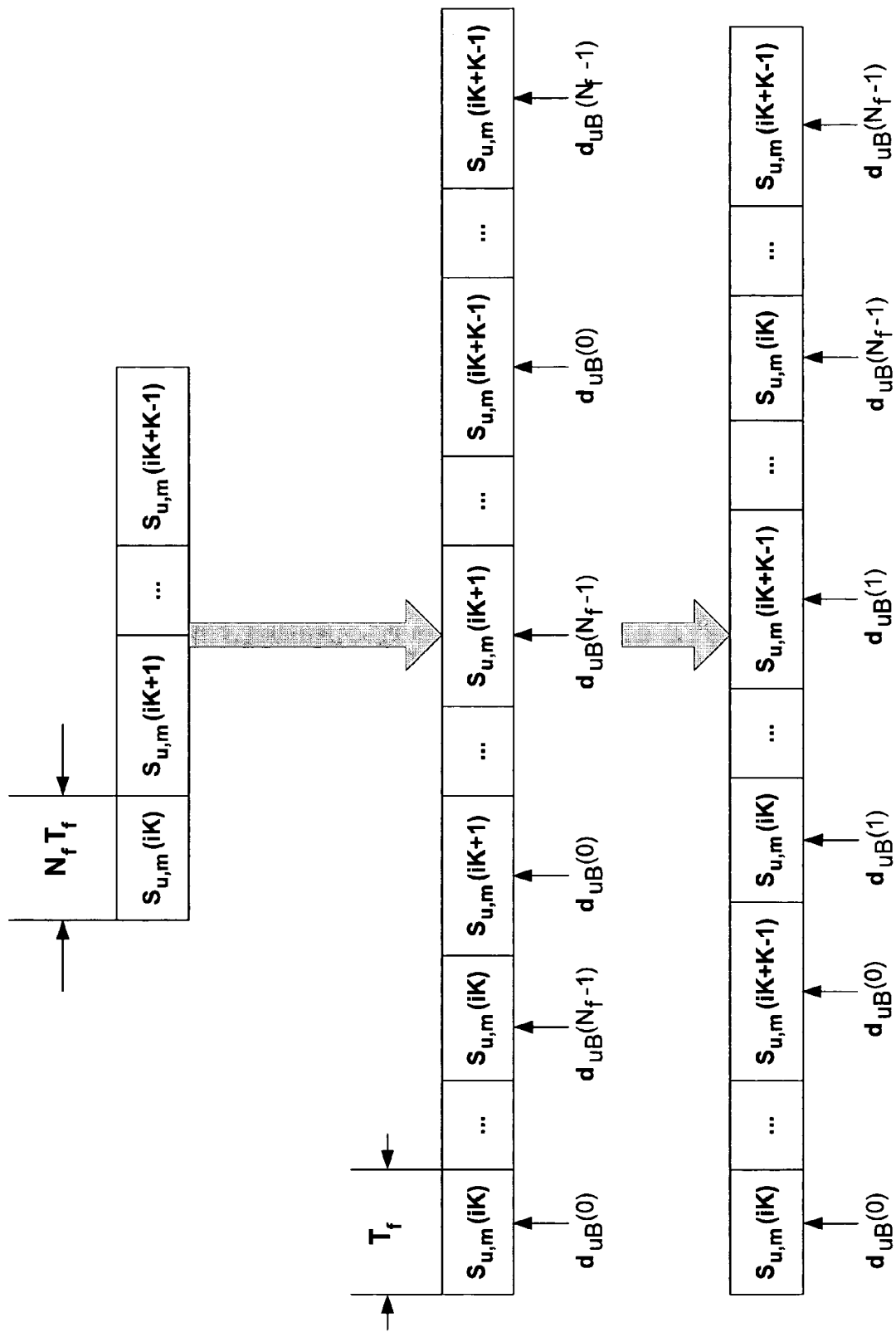
FIG. 6 illustrates an example data stream generated by a multi-user block-spreading unit within a UWB transmitter of FIG. 3.

FIG. 6 illustrates the multi-user block-spreading stage with MU address matrices $D_{uB}$ as given in equation (10). Data stream 24 is generated from data stream 22 by multi-user block-spreading unit 23 within transmitter 12 of FIG. 3. Data stream 22 represents the data stream on the $m^{th}$ branch of the $u^{th}$ user with blocks of symbols of length K. Multi-user block-spreading unit 23 applies Q×K block-spreading matrix $D_{uB}$ to obtain data stream 24 given by the Q×1 output vectors in equation (9). Multi-user block-spreading unit 23 can be viewed as first symbol-spreading each of the K symbols into Q frame-rate blocks followed by frame-interleaving the Q frame-rate blocks.

Figure 7:
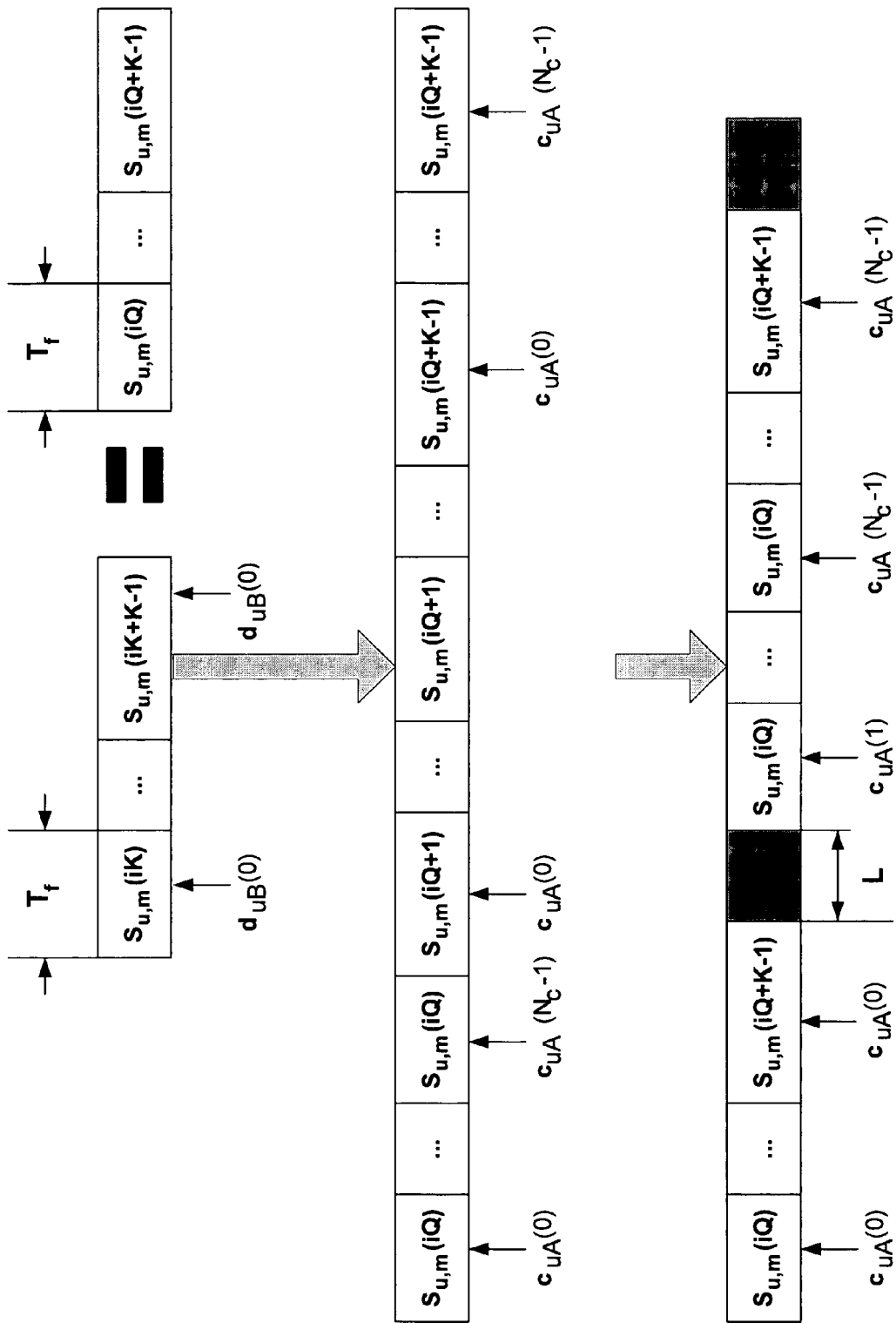
FIG. 7 illustrates an example data stream generated by a TH block-spreading unit within the transmitter of FIG. 3.

FIG. 7 illustrates a sub-block of the TH block-spreading stage with TH address sub-matrix $C_{uA}^{(0)}$ as given in equation (14). Data stream 26 is generated from data stream 24 by TH block-spreading unit 25 within transmitter 12 of FIG. 3. Data stream 26 represents the single block to be transmitted on the $m_{th}$ branch of the $u^{th}$ user and is given by equation (16). Each block of Q frames is spread into P chips with L zeros padded between blocks of P chips. TH spreading unit 25 can be viewed as first symbol-spreading frame-rate blocks into P chips followed by chip-interleaving and zero padding.

Figure 8:
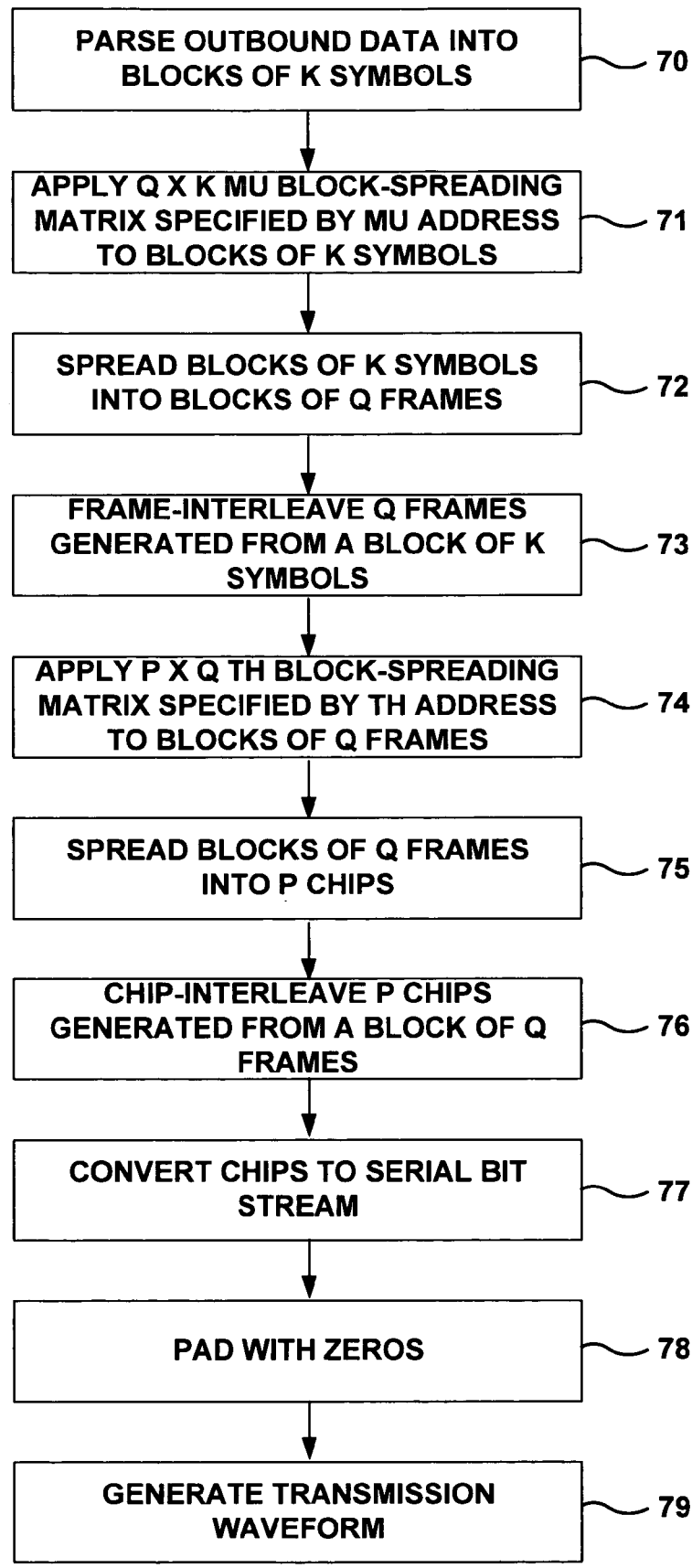
FIG. 8 is a flowchart illustrating an example mode of operation of a transmitter in the UWB communication system of FIG. 3.

FIG. 8 is a flowchart illustrating an example mode of operation of a transmitter 12 in communication system 10 in which MS-BS preserves the orthogonality of transmitted waveforms through communication channel 16 thereby deterministically eliminating MUI 18 at receiver 14. Generally, transmitter 12 parses an outbound serial data stream into blocks of K symbols (70) and subsequently applies Q×K MU block-spreading matrix $D_{uB}$ (71) corresponding to the specified user's assigned MU address. This spreads blocks of K symbols into Q frames (72) and interleaves the frames for the K symbols (73).

TH spreading matrix $C_{uA}$ of size P×Q is applied (74) according to the specified use's assigned TH address. TH spreading matrix $C_{uA}$ spreads blocks of Q frames into blocks of P chips (75) and interleaves the chips for the Q frames (76). Zeros are padded between each block of P chips (77). The chips that are generated from the same block of symbols are, therefore, temporally spaced and zero padded. In this manner, each block of K symbols produces $N_f N_c(K+L)$ interleaved chips, where L represents the number of zeros, $N_f$ represents the number of frames over which an identical information bearing symbol is repeated, and $N_c$ represents the number of chips per frame. Transmitter 12 converts the interleaved multi-stage block-spread chips into a serial bit stream (78) and generates a transmission waveform for carrying the data through communication channel 16 to receiver 14 (79).

Figure 9:
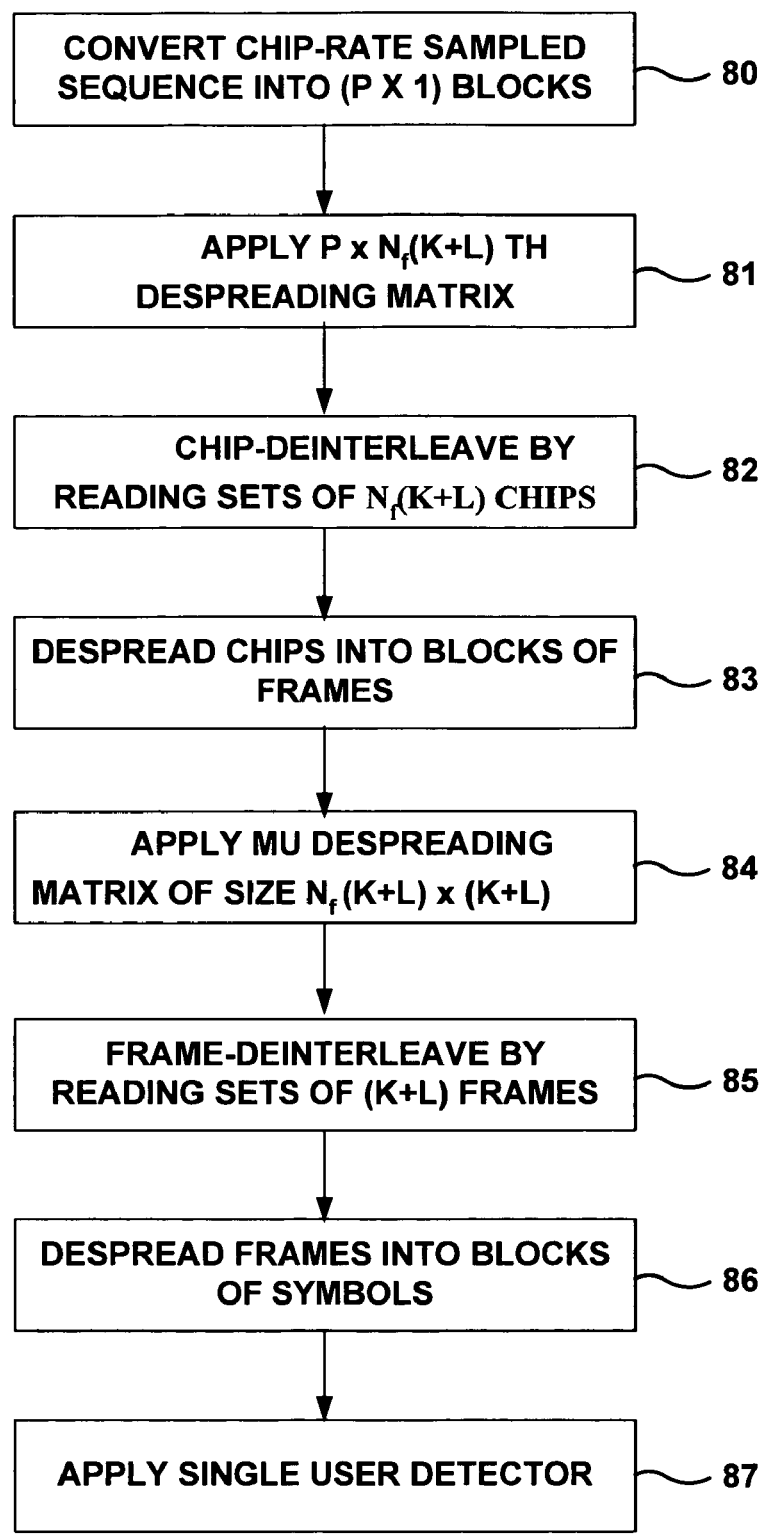
FIG. 9 is a flowchart illustrating an example mode of operation of a receiver in the UWB communication system of FIG. 3.

FIG. 9 is a flowchart illustrating an example mode of operation of a receiver 14 in communication system 10. Receiver 14 serial to parallel converts the received chip-rate sampled sequence P×1 blocks (80). TH de-spreading matrix $\check{C}_{uA}$ of size P×$N_f$(K+L) is applied to the P×1 blocks (81) reading subsets of $N_f$(K+L) chips, each subset having P chips that were generated from the same symbol, thereby de-interleaving the chips (82). The de-interleaved chips are then de-spread into blocks of frames (83) to which MU de-spreading matrix $\check{D}_{uB}$ of size $N_f$(K+L)×(K+L) is applied (84). K+L subsets of the stored frames, each subset having $N_f K$ frames that were generated from the same block of symbols are de-interleaved (85) and de-spread into blocks symbols (86). Receiver 12 then applies a single user detector to eliminate channel effects and output symbols based on the soft estimates (87).

Figure 10:
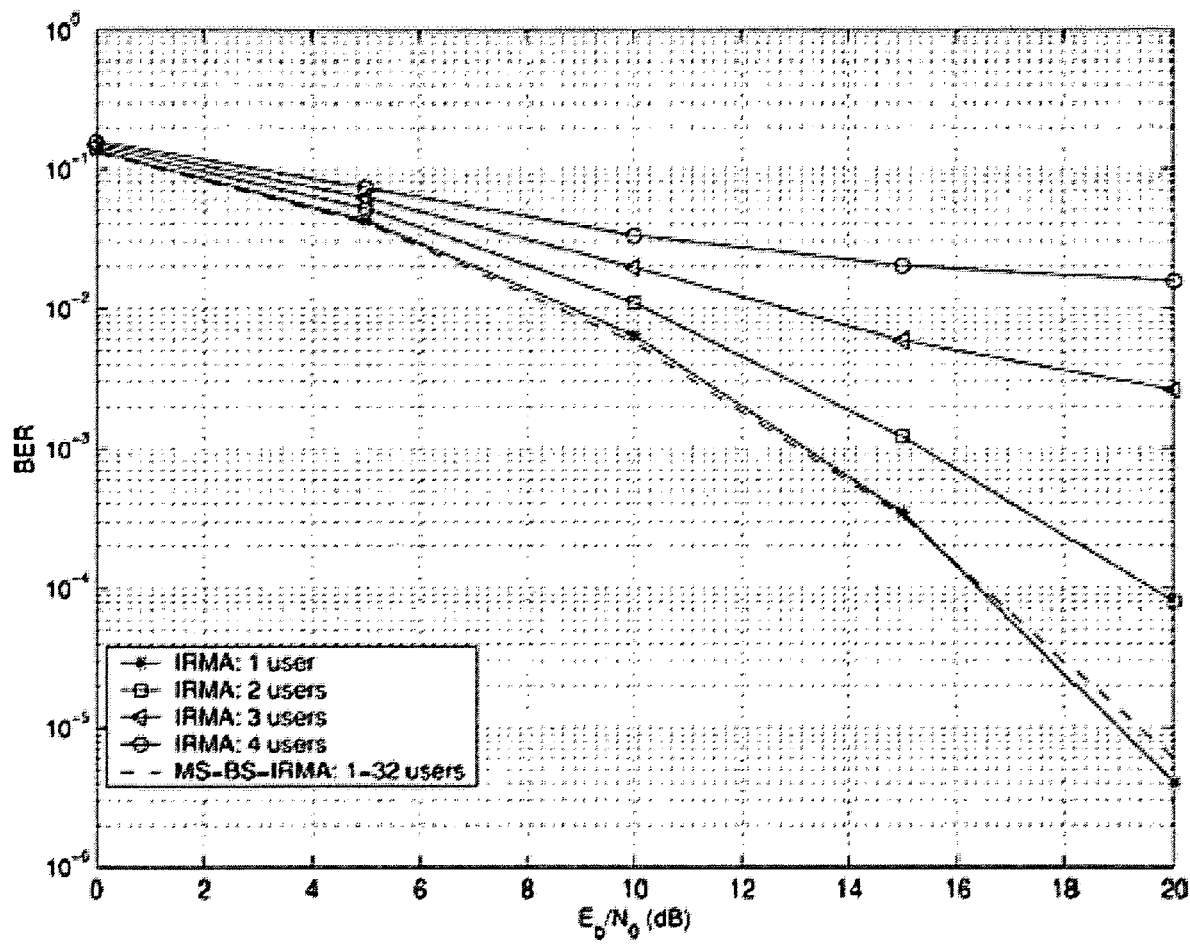
FIGS. 10-13 are graphs illustrating modeled performance estimates of the techniques described herein.
Figure 11:
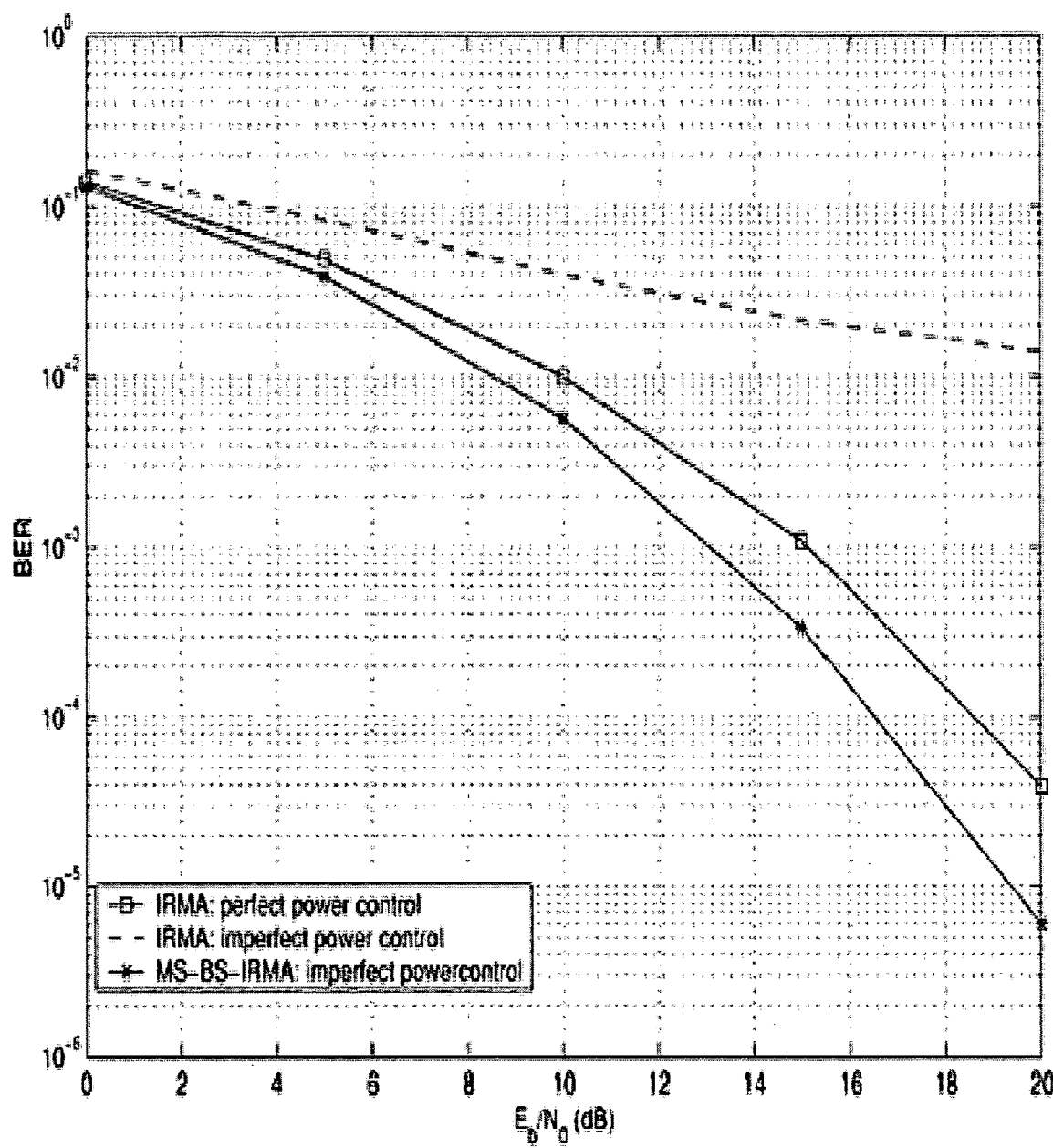

FIGS. 10 and 11 are graphs illustrating the BER performance of a matched filter (MF), RAKE, receiver of a conventional IRMA system against the MS-BS IMRA technique in the presence of frequency selective channels. A filter matched to the desired user's TH code and the number of users is confined to $N_u \leq N_c$ in the conventional IRMA system. For both systems, parameters are adjusted to avoid ISI and symbol by symbol reception is performed at the receiver.

FIG. 10 illustrates BER performance of the conventional IRMA system with one, two, three, and four users compared to an MS-BS IRMA system with the active number of users in the range of $1 \leq N_u \leq 32$ in an uplink scenario with perfect power control, i.e. $P_u$ for all users. In particular, FIG. 10 illustrates how the BER performance of a conventional IRMA system degrades as the number of users increases while the BER performance of the MS-BS IRMA system remains invariant as the number of active users changes in the specified range.

FIG. 11 illustrates BER performance of the conventional IRMA system compared to an MS-BS IRMA system in an uplink scenario with two active users, user 1 being the desired user, and the effective transmission power of user 2 twice that of user 1. In particular, FIG. 11 illustrates that the imperfect power control has no effect on the BER performance of the MS-BS IRMA system while the conventional IRMA system encounters degradation in BER performance.

Figure 12:
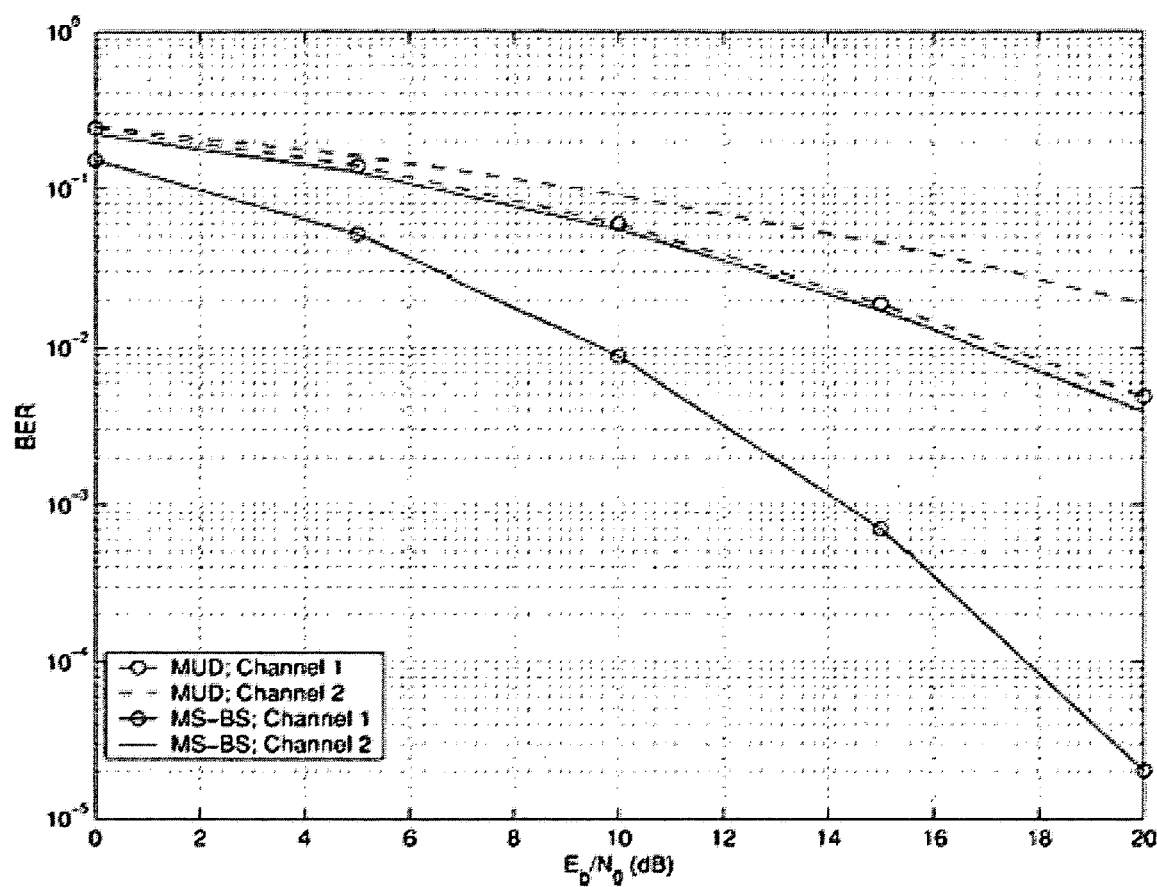
Figure 13:
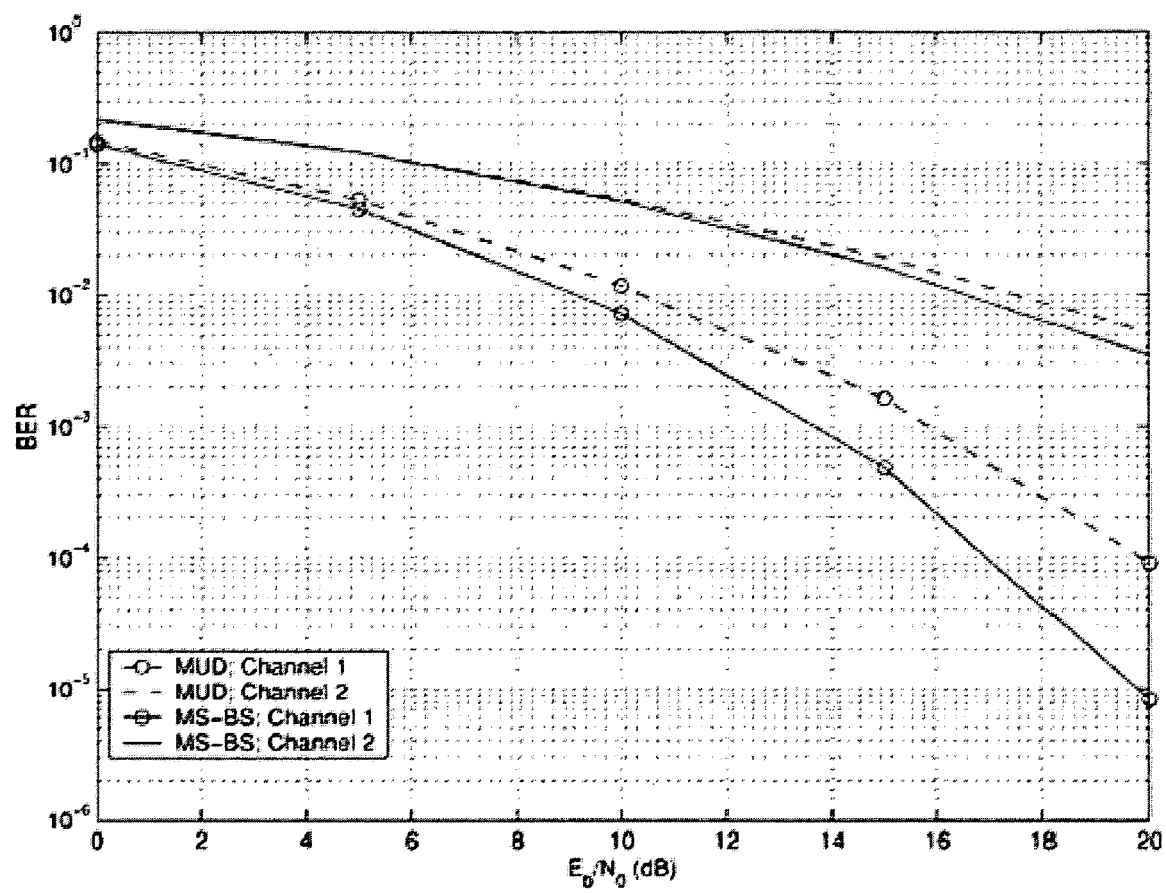

FIGS. 12 and 13 illustrate the BER performance over 1,000 channel realizations of the MS-BS IMRA technique compared to the MUD IRMA technique, which is applies only to the downlink scenario. FIG. 12 illustrates the MS-BS IMRA technique compared to the MUD IRMA technique with a zero-forcing (ZF) linear receiver. FIG. 13 illustrates the MS-BS IMRA technique compared to the MUD IRMA technique with a minimum mean-square error (MMSE) linear receiver.

Various embodiments of the invention have been described. The described techniques may provide advantages in multi-user communication systems. Conventional IRMA systems approximate MUI as Gaussian noise and use TH codes with strict power control to statistically suppress MUI. Applying a first and a second block-spreading code selected from a first and a second set of mutually orthogonal block-spreading codes in which the first and the second set of mutually orthogonal block-spreading codes are also orthogonal preserves the orthogonality of transmitted waveforms through frequency selective communications. As a result, MUI and ISI can be eliminated deterministically. Such systems allow each user to use a different detector that can be chosen in favor for low complexity or high performance without interfering with other users.

"Multi-stage block-spreading" may use a first set of mutually orthogonal MU spreading codes, e.g. direct sequence CDMA codes or digital carrier frequency multiple access codes, and a second set of mutually orthogonal TH codes. The number of orthogonal mutually orthogonal MU spreading codes and TH spreading codes may be equal to the number of frames over which identical information bearing symbols, $N_f$, are transmitted and the number of chips per frame, $N_c$, respectively. As a result, a group of users may be assigned the same TH code with each user in the group uniquely identified by a different MU code. The maximum number of uniquely identified users in a MS-BS IRMA system is, therefore, $N_c N_f$, with each user identified by a MU address and TH address corresponding to a specific MU and TH code respectively.

Further, such systems do not exhibit BER degradation as the number of users increases and requires no additional power to achieve a specified BER regardless of the multi-path channel. Different users may also be provided with variable transmission rates by assigning a single user more than one set of MU and TH addresses.

The described techniques can be embodied in a variety of devices that communicate using ultra wideband communication, including base stations, mobile phones, laptop computers, handheld computing devices, personal digital assistants (PDA's), a device within a personal area network, a device within a sensor network, and the like. The devices may include a digital signal processor (DSP), field programmable gate array (FPGA), application specific integrated circuit (ASIC) or similar hardware, firmware and/or software for implementing the techniques. If implemented in software, a computer-readable medium may store computer readable instructions, i.e., program code, that can be executed by a processor or DSP to carry out one of more of the techniques described above. For example, the computer-readable medium may comprise random access memory (RAM), read-only memory (ROM), non-volatile random access memory (NVRAM), electrically erasable programmable read-only memory (EEPROM), flash memory, or the like. The computer-readable medium may comprise computer readable instructions that when executed in a wireless communication device, cause the wireless communication device to carry out one or more of the techniques described herein. These and other embodiments are within the scope of the following claims.

The invention claimed is:

1. A method comprising:
    generating a stream of frames from blocks of information bearing symbols by applying an orthogonal set of spreading codes to the block of information bearing symbols to form frames and interleaving the frames corresponding to different block of information bearing symbols to form the stream of frames;
    generating a stream of chips from the stream of frames by applying an orthogonal set of time-hopping spreading codes to the stream of frames to form chips and interleaving the chips corresponding to different frames to form the stream of chips; and
    outputting an ultra wideband (UWB) transmission signal from the stream of chips.

2. The method of claim 1, wherein applying an orthogonal set of spreading codes comprises applying direct sequence code-division multiple access codes or digital carrier frequency division multiple access codes.

3. The method of claim 1, wherein generating a stream of chips further comprises:
    storing the chips in an array having M columns and K+L rows, where L is a function of a communication channel length; and
    padding each column of the array with L guard chips.

4. The method of claim 3, wherein the L guard chips comprise null values.

5. The method of claim 3, wherein outputting the UWB transmission signal comprises by reading the chips from the array in column-wise fashion.

6. The method of claim 3, wherein the set of spreading codes and the set of time-hopping spreading codes are mutually orthogonal so that the interleaved and padded chips retain their orthogonality after passing through a multi-path communication channel.

7. The method of claim 3, further comprising:
    assigning each of the set of spreading codes to a different user of a group of users; and
    assigning each user of the group a common one of the set of time-hopping spreading codes.

8. The method of claim 3, further comprising assigning unique addresses to users as unique pair-wise combinations of the set of orthogonal spreading codes and the set of time hopping spreading codes.

9. The method of claim 8, wherein the total number of users $N_u$ supported by the wireless communication devices equals $N_c * N_f$, where each of the information bearing symbols is repeated over $N_f$ frames and each frame includes $N_c$ chips, wherein $N_f$ and $N_c$ are integers.

10. The method of claim 9, wherein each of the unique addresses comprises a unique multiple user address ($u_B$) selected from set of spreading codes in combination with a unique time-hopping address ($u_A$) selected from the set of time-hopping codes.

11. The method of claim 10, further comprising selecting the unique multiple addresses and the unique time-hopping addresses in accordance with:

$$u_A = u (\bmod N_C), \text{ and}$$

$$u_B = \lfloor u/N_c \rfloor, \text{ wherein } u \in [0, N_c N_f - 1].$$

12. The method of claim 1, further comprising:
    receiving the UWB transmission signal; and
    outputting a stream of estimate symbols from the signal using a two-stage de-spreading unit having a time-hopping de-spreading module and a multi-user de-spreading module.

13. The method of claim 12, wherein outputting a stream of estimate symbols comprise:
    converting the UWB transmission signal to a stream of chips;
    applying a first de-spreading matrix with the time-hopping de-spreading module to de-interleave the chips into blocks of frames;
    applying a second de-spreading matrix to the blocks of frames with the multi-user de-spreading module to de-interleave the frames and produce blocks of estimate symbols; and
    applying a single user detection scheme to the blocks of estimate symbols to output the stream of estimate symbols.

14. The method of claim 13, wherein applying first and second de-spreading matrices deterministically eliminates multiple user interference.

15. The method of claim 13, wherein applying a first de-spreading matrix comprises:
    parsing the chips into blocks of P chips; and applying a time-hopping de-spreading matrix of size $P \times N_f(K+L)$ to the blocks, where each of the information bearing symbols is repeated over $N_f$ frames, L is a function of the communication channel length, and the stream of frames was generated during transmission using blocks of K symbols.

16. The method of claim 13, wherein applying a second de-spreading matrix comprises applying a second de-spreading matrix of size $N_f(K+L) \times (K+L)$ matrix, where each of the information bearing symbols is repeated over $N_f$ frames, L is a function of the communication channel length, and the stream of frames was generated during transmission using blocks of K symbols.

17. A wireless communication device comprising:
a multiple-user block-spreading unit that generates a set of frames for respective blocks of information bearing symbols by applying an orthogonal set of spreading codes to the block of information symbols and produces a stream of frames in which the frames from different sets are interleaved;
a time-hopping block-spreading unit that generates a set of chips for each frame by applying an orthogonal set of time-hopping spreading codes to the stream of frames and outputs a stream of chips in which the chips generated from different frames are interleaved; and
a pulse shaping unit to output an ultra wideband (UWB) transmission signal from the stream of chips.

18. The wireless communication device of claim 17, wherein the set of spreading codes comprises direct sequence code-division multiple access codes.

19. The wireless communication device of claim 17,
wherein the time-hopping block spreading unit comprises memory to store the chips in an array having columns and rows, where the number of rows in the array is a function of a communication channel length, and
wherein the time-hopping block spreading unit pads each column of the array with guard chips, and outputs the transmission signal by reading the chips from the array in column-wise fashion.

20. The wireless communication device of claim 19, wherein the set of spreading codes and the set of time-hopping spreading codes are mutually orthogonal so that the interleaved and padded chips retain their orthogonality after passing through a multi-path communication channel.

21. The wireless communication device of claim 20, wherein the wireless communication device stores a unique address assigned to one of a plurality of users, and the unique address is formed from a pair-wise combination of one of the set of orthogonal spreading codes and one of the set of time hopping spreading codes.

22. The wireless communication device of claim 17, wherein the wireless communication device comprises one of a base station and a mobile device, a device within a personal area network, or a device within a sensor network.

23. A wireless communication device comprising a two-stage despreading unit that processes a received ultra wideband (UWB) transmission signal to produce estimate symbols, wherein the received UWB signal comprises a multi-user block-spread UWB signal formed from interleaved symbol frames and interleaved chips within the symbol frames, and wherein the two-stage despreading unit comprises:
a time-hopping de-spreading module that applies a first de-spreading matrix to de-interleave the chips into blocks of frames; and
a multi-user de-spreading module that applies a second de-spreading matrix to de-interleave the frames and produce blocks of estimate symbols.

24. The wireless communication device of claim 23, wherein the wireless communication device comprises one of a base station and a mobile device.

25. A system comprising:
a wireless transmitter to transmit an ultra wideband (UWB) signal according to interleaved chips generated from interleaved frames produced by blocks of information bearing symbols, wherein the transmitter comprises:
a multiple-user block-spreading unit that generates a set of frames for respective blocks of information bearing symbols by applying an orthogonal set of spreading codes to the block of information bearing symbols and produces a stream of frames in which the frames from different sets are interleaved;
a time-hopping block-spreading unit that generates a set of chips for each of the frames by applying an orthogonal set of time-hopping spreading codes to the interleaved frames and outputs a stream of chips in which the chips generated from different frames are interleaved; and
a pulse shaping unit to output the UWB transmission signal from the stream of interleaved chips; and
a wireless receiver to receive the UWB signal and de-interleave the chips and frames to produce estimate symbols.

26. A system comprising:
a wireless transmitter to transmit an ultra wideband (UWB) signal according to interleaved chips generated from interleaved frames produced by blocks of information bearing symbols; and
a wireless receiver to receive the UWB signal and de-interleave the chips and frames to produce estimate symbols, wherein the receiver comprises:
a time-hopping de-spreading module that applies a first de-spreading matrix to the UWB signal to de-interleave chips into blocks of frames; and
a multi-user de-spreading module that applies a second de-spreading matrix to de-interleave the frames and produce blocks of estimate symbols.

27. A computer-readable medium comprising instructions to cause a programmable processor of a wireless communication device to:
generate a stream of frames from blocks of information bearing symbols by applying an orthogonal set of spreading codes to the block of information bearing symbols to form the frames and interleaving the frames corresponding to different block of information bearing symbols to form frames;
generate a stream of chips from the stream of frames by applying an orthogonal set of time-hopping spreading codes to the stream of frames to form chips and interleaving the chips corresponding to different frames to form the stream of chips; and
output an ultra wideband (UWB) transmission signal from the stream of chips.

* * * * *

UNITED STATES PATENT AND TRADEMARK OFFICE
CERTIFICATE OF CORRECTION

PATENT NO.         : 7,496,128 B2                                      Page 1 of 1
APPLICATION NO. : 10/796895
DATED              : February 24, 2009
INVENTOR(S)        : Georgios B. Giannakis and Liuqing Yang It is certified that error appears in the above-identified patent and that said Letters Patent is hereby corrected as shown below:

Column 1, Line 14, "DAAD19-01-2-011" should read --DAAD19-01-2-0011--

Signed and Sealed this

Sixteenth Day of June, 2009

JOHN DOLL
*Acting Director of the United States Patent and Trademark Office*